United States Patent
DeMuth et al.

(10) Patent No.: US 12,533,849 B2
(45) Date of Patent: *Jan. 27, 2026

(54) SWITCHYARD BEAM ROUTING OF PATTERNED LIGHT FOR ADDITIVE MANUFACTURING

(71) Applicant: Seurat Technologies, Inc., Wilmington, MA (US)

(72) Inventors: James A. DeMuth, Woburn, MA (US); Francis L. Leard, Sudbury, MA (US); Erik Toomre, Los Altos, CA (US)

(73) Assignee: Seurat Technologies, Inc., Wilmington, MA (US)

( * ) Notice: Subject to any disclaimer, the term of this patent is extended or adjusted under 35 U.S.C. 154(b) by 245 days.

This patent is subject to a terminal disclaimer.

(21) Appl. No.: 18/364,177

(22) Filed: Aug. 2, 2023

(65) Prior Publication Data

US 2023/0373162 A1    Nov. 23, 2023

Related U.S. Application Data

(63) Continuation of application No. 17/242,042, filed on Apr. 27, 2021, now Pat. No. 11,801,636, which is a
(Continued)

(51) Int. Cl.
*B22F 12/30* (2021.01)
*B22F 10/00* (2021.01)
(Continued)

(52) U.S. Cl.
CPC ............ *B29C 64/282* (2017.08); *B22F 10/00* (2021.01); *B22F 10/28* (2021.01); *B22F 10/30* (2021.01); *B22F 12/44* (2021.01); *B22F 12/49* (2021.01); *B29C 64/153* (2017.08); *B29C 64/255* (2017.08); *B29C 64/264* (2017.08); *B29C 64/268* (2017.08); *B33Y 50/02* (2014.12); *G02B 26/0808* (2013.01); *G02B 26/0816* (2013.01);
(Continued)

(58) Field of Classification Search
CPC ........ B22F 12/30; B22F 12/44; B29C 64/245; B29C 64/264; B29C 64/286; B33Y 30/00; G02B 26/08; G02B 26/0808; G02B 26/0816; G02B 27/28; G02B 27/283; G02F 1/0136; G02F 1/31; G02F 1/311
USPC ..... 425/78, 174.4; 349/196; 359/223.1, 298, 359/320
See application file for complete search history.

(56) References Cited

U.S. PATENT DOCUMENTS 5,345,321 A * 9/1994 DeJule .................. G02F 1/31
349/196

FOREIGN PATENT DOCUMENTS

WO    2017075258    5/2017

* cited by examiner

*Primary Examiner* — Leo B Tentoni
(74) *Attorney, Agent, or Firm* — David R. Stevens; Stevens Law Group

(57) ABSTRACT

A method and an apparatus for additive manufacturing pertaining to high efficiency, energy beam patterning and beam steering to effectively and efficiently utilize the source energy. In one embodiment recycling and reuse of unwanted light includes a source of multiple light patterns produced by one or more light valves, with at least one of the multiple light patterns being formed from rejected patterned light. An image relay is used to direct the multiple light patterns, and a beam routing system receives the multiple light patterns and respectively directs them toward defined areas on a powder bed.

13 Claims, 18 Drawing Sheets

Related U.S. Application Data continuation of application No. 15/977,270, filed on May 11, 2018, now Pat. No. 11,014,302.

(60) Provisional application No. 62/504,822, filed on May 11, 2017.

(51) Int. Cl.
  *B22F 10/28* (2021.01)
  *B22F 10/30* (2021.01)
  *B22F 12/44* (2021.01)
  *B22F 12/49* (2021.01)
  *B29C 64/153* (2017.01)
  *B29C 64/245* (2017.01)
  *B29C 64/255* (2017.01)
  *B29C 64/264* (2017.01)
  *B29C 64/268* (2017.01)
  *B29C 64/282* (2017.01)
  *B29C 64/286* (2017.01)
  *B33Y 50/02* (2015.01)
  *G02B 26/08* (2006.01)
  *G02B 27/28* (2006.01)
  *G02F 1/01* (2006.01)
  *G02F 1/31* (2006.01)
  *B22F 10/70* (2021.01)
  *B22F 12/41* (2021.01)
  *B33Y 10/00* (2015.01)
  *B33Y 30/00* (2015.01)
  *G02B 27/10* (2006.01)

(52) U.S. Cl.
  CPC ........ *G02B 27/283* (2013.01); *G02F 1/0136* (2013.01); *B22F 10/70* (2021.01); *B22F 12/41* (2021.01); *B33Y 10/00* (2014.12); *B33Y 30/00* (2014.12); *G02B 27/10* (2013.01); *G02F 1/311* (2021.01); *G05B 2219/49018* (2013.01); *G05B 2219/49023* (2013.01)

SWITCHYARD BEAM ROUTING OF PATTERNED LIGHT FOR ADDITIVE MANUFACTURING

CROSS-REFERENCE TO RELATED PATENT APPLICATION

The present disclosure is a continuation of U.S. patent application Ser. No. 17/242,042, filed on Apr. 27, 2021 and issued as U.S. Pat. No. 11,801,636 on Oct. 31, 2023, which is a continuation of U.S. patent application Ser. No. 15/977,270, filed on May 11, 2018 and issued as U.S. Pat. No. 11,014,302 on May 25, 2021, which in turn is part of a non-provisional patent application claiming the priority benefit of U.S. Patent Application No. 62/504,822, filed on May 11, 2017, all of which are hereby incorporated by reference in their entirety.

TECHNICAL FIELD

The present disclosure generally relates to optics for additive manufacturing and, more specifically, to an optical system including switchyard style beam routing subsystems able to direct one or more patterned light beams.

BACKGROUND

Complex systems for redirecting laser light have been used in many high power applications. For example, the Lawrence Livermore National Laboratory supports a National Ignition Facility able to redirect high power laser beams toward a target. A beam enclosure redirects multiple incoming laser beams to a top and bottom of a target chamber. After laser beams travel through the laser bays, they enter a system of beam enclosures with turning mirrors that redirect the beam to the upper and lower hemispheres of the target chamber. This manual system converts a parallel laser beam layout to the spherical configuration of the target chamber. In operation, the turning mirrors direct multiple laser beams to enter the target chamber along radial lines, converging on the target.

Laser based systems for additive manufacturing can also involve light redirection. For example, one type of diode laser additive manufacturing involve combining multiple beams into a single beam, and then separating the beam by splitting a light source into negative and positive patterned images. Often, one patterned beam image used to build parts and the other beam image is discarded into a beam dump. Such patterns can be created by use of a liquid crystal based light valve that allows for the spatial modulation of transmitted or reflected light by rotating the electromagnetic wave polarization state. A typical example would have polarized light "drive beam" passing through a liquid crystal filled light valve, which then spatially imprints a pattern in polarization space on the drive beam. The polarization state of the light desired is allowed to continue to the rest of the optical system, and the unwanted state is rejected and thrown away to a beam dump or other energy rejection device.

Splitting, combining, and routing one or more such patterned or unpatterned beams can be complex. Systems able to efficiently route and direct patterned or unpatterned beams can simplify use of multiple powder beds, allow for full or partial overlapping of beams, or limit energy losses due to rejected or unwanted beam patterns.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1A:
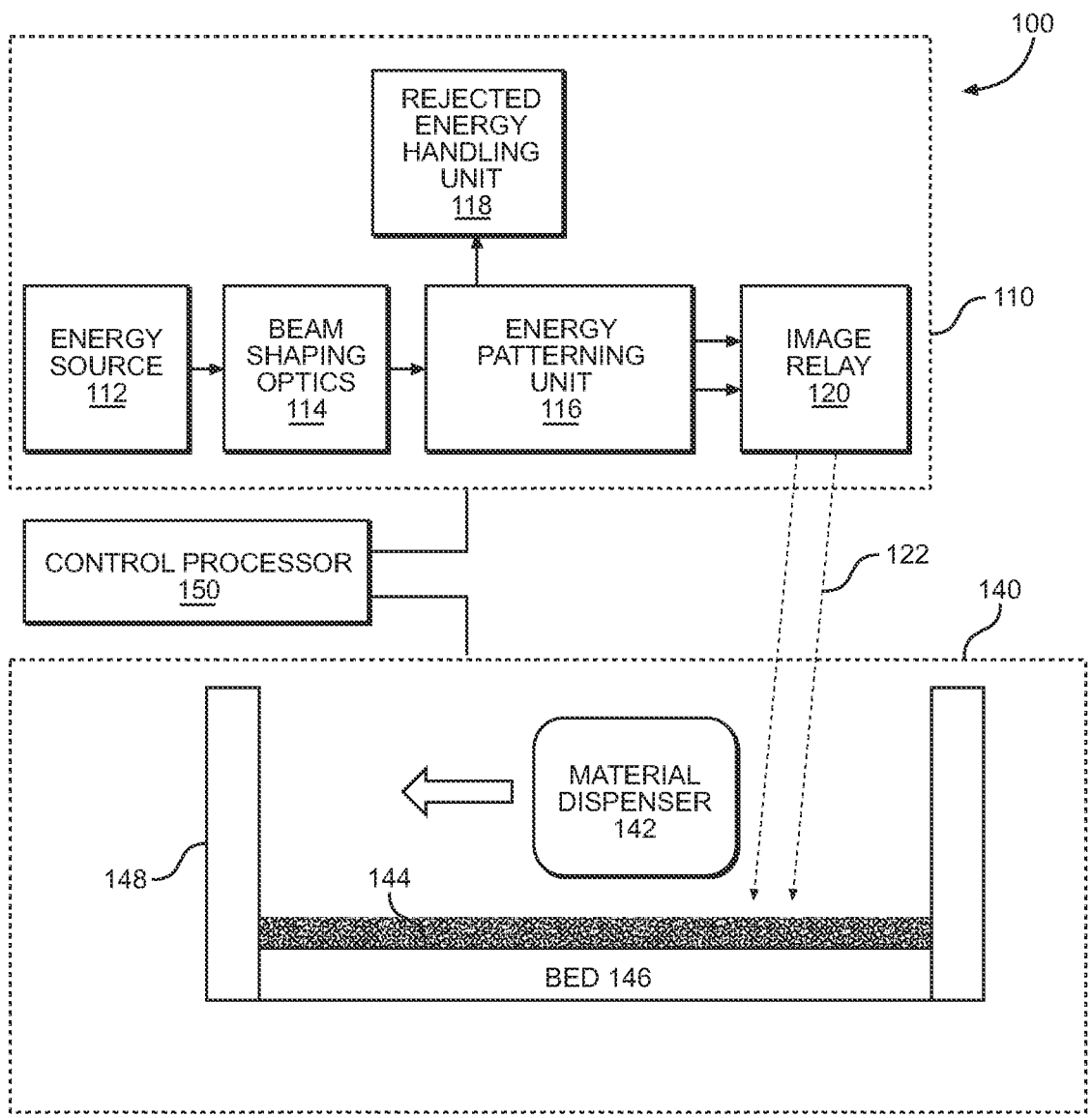
FIG. 1A illustrates an additive manufacturing system.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The present disclosure illustrates a "switchyard" style optical system suitable for reducing the light wasted in the additive manufacturing system as caused by rejection of unwanted light due to the pattern to be printed. A "switchyard", as used in this context, describes a system and method to redirect a complex pattern from its generation (in this case, a plane whereupon a spatial pattern is imparted to structured or unstructured beam) to its delivery through a series of switch points. Each switch point can optionally modify the spatial profile of the incident beam. The switchyard optical system may be utilized in, for example and not limited to, laser-based additive manufacturing techniques where a mask is applied to the light. Advantageously, in various embodiments in accordance with the present disclosure, the thrown-away energy may be recycled in either a homogenized form or as a patterned light that is used to maintain high power efficiency or high throughput rates. Moreover, the thrown-away energy can be recycled and reused to increase intensity to print more difficult materials.

By recycling and re-using rejected light, system intensity can be increased proportional to the fraction of light rejected. This allows for all the energy to be used to maintain high printing rates. Additionally, the recycling of the light potentially enables a "bar" print where a single bar sweeps across the build platform. Alternatively, pattern recycling could allow creation of a solid-state matrix coextensive with the build platform that does not require movement to print all areas of the build platform.

An additive manufacturing system is disclosed which has one or more energy sources, including in one embodiment, one or more laser or electron beams, positioned to emit one or more energy beams. Beam shaping optics may receive the one or more energy beams from the energy source and form a single beam. An energy patterning unit receives or generates the single beam and transfers a two-dimensional pattern to the beam, and may reject the unused energy not in the pattern. An image relay receives the two-dimensional patterned beam and focuses it as a two-dimensional image to a desired location on a height fixed or movable build platform (e.g. a powder bed). In certain embodiments, some or all of any rejected energy from the energy patterning unit is reused.

In some embodiments, multiple beams from the laser array(s) are combined using a beam homogenizer. This combined beam can be directed at an energy patterning unit that includes either a transmissive or reflective pixel addressable light valve. In one embodiment, the pixel addressable light valve includes both a liquid crystal module having a polarizing element and a light projection unit providing a two-dimensional input pattern. The two-dimensional image focused by the image relay can be sequentially directed toward multiple locations on a powder bed to build a 3D structure.

As seen in FIG. 1, an additive manufacturing system 100 has an energy patterning system 110 with an energy source 112 that can direct one or more continuous or intermittent energy beam(s) toward beam shaping optics 114. After shaping, if necessary, the beam is patterned by an energy patterning unit 116, with generally some energy being directed to a rejected energy handling unit 118. Patterned energy is relayed by image relay 120 toward an article processing unit 140, typically as a two-dimensional image 122 focused near a bed 146. The bed 146 (with optional walls 148) can form a chamber containing material 144 dispensed by material dispenser 142. Patterned energy, directed by the image relay 120, can melt, fuse, sinter, amalgamate, change crystal structure, influence stress patterns, or otherwise chemically or physically modify the dispensed material 144 to form structures with desired properties.

Energy source 112 generates photon (light), electron, ion, or other suitable energy beams or fluxes capable of being directed, shaped, and patterned. Multiple energy sources can be used in combination. The energy source 112 can include lasers, incandescent light, concentrated solar, other light sources, electron beams, or ion beams. Possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/MnCl$_2$) vapor laser.

A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate(Nd:YVO$_4$) laser, Neodymium doped yttrium calcium oxoborateNd:YCa$_4$O(BO$_3$)$^3$ or simply Nd:YCOB, Neodymium glass(Nd:Glass) laser, Titanium sapphire(Ti:sapphire) laser, Thulium YAG (Tm:YAG) laser, Ytterbium YAG (Yb:YAG) laser, Ytterbium:2O$_3$ (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride(Ce:LiSAF, Ce:LiCAF), Promethium 147 doped phosphate glass(147Pm$^{+3}$:Glass) solid-state laser, Chromium doped chrysoberyl (alexandrite) laser, Erbium doped anderbium-ytterbium co-doped glass lasers, Trivalent uranium doped calcium fluoride (U:CaF$_2$) solid-state laser, Divalent samarium doped calcium fluoride(Sm:CaF$_2$) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

For example, in one embodiment a single Nd:YAG q-switched laser can be used in conjunction with multiple semiconductor lasers. In another embodiment, an electron beam can be used in conjunction with an ultraviolet semiconductor laser array. In still other embodiments, a two-dimensional array of lasers can be used. In some embodiments with multiple energy sources, pre-patterning of an energy beam can be done by selectively activating and deactivating energy sources.

Beam shaping unit 114 can include a great variety of imaging optics to combine, focus, diverge, reflect, refract, homogenize, adjust intensity, adjust frequency, or otherwise shape and direct one or more energy beams received from the energy source 112 toward the energy patterning unit 116. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

Energy patterning unit 116 can include static or dynamic energy patterning elements. For example, photon, electron, or ion beams can be blocked by masks with fixed or movable elements. To increase flexibility and ease of image patterning, pixel addressable masking, image generation, or transmission can be used. In some embodiments, the energy patterning unit includes addressable light valves, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In yet another embodiment, an electron patterning device receives an address pattern from an electrical or photon stimulation source and generates a patterned emission of electrons.

Rejected energy handling unit 118 is used to disperse, redirect, or utilize energy not patterned and passed through the energy pattern image relay 120. In one embodiment, the rejected energy handling unit 118 can include passive or active cooling elements that remove heat from the energy patterning unit 116. In other embodiments, the rejected energy handling unit can include a "beam dump" to absorb and convert to heat any beam energy not used in defining the energy pattern. In still other embodiments, rejected beam energy can be recycled using beam shaping optics 114. Alternatively, or in addition, rejected beam energy can be directed to the article processing unit 140 for heating or further patterning. In certain embodiments, rejected beam energy can be directed to additional energy patterning systems or article processing units.

Image relay 120 receives a patterned image (typically two-dimensional) from the energy patterning unit 116 and guides it toward the article processing unit 140. In a manner similar to beam shaping optics 114, the image relay 120 can include optics to combine, focus, diverge, reflect, refract, adjust intensity, adjust frequency, or otherwise shape and direct the patterned image.

Article processing unit 140 can include a walled chamber 148 and bed 144, and a material dispenser 142 for distributing material. The material dispenser 142 can distribute, remove, mix, provide gradations or changes in material type or particle size, or adjust layer thickness of material. The material can include metal, ceramic, glass, polymeric powders, other melt-able material capable of undergoing a thermally induced phase change from solid to liquid and back again, or combinations thereof. The material can further include composites of melt-able material and non-melt-able material where either or both components can be selectively targeted by the imaging relay system to melt the component that is melt-able, while either leaving along the non-melt-able material or causing it to undergo a vaporizing/destroying/combusting or otherwise destructive process. In certain embodiments, slurries, sprays, coatings, wires, strips, or sheets of materials can be used. Unwanted material can be removed for disposable or recycling by use of blowers, vacuum systems, sweeping, vibrating, shaking, tipping, or inversion of the bed 146.

In addition to material handling components, the article processing unit 140 can include components for holding and supporting 3D structures, mechanisms for heating or cooling the chamber, auxiliary or supporting optics, and sensors and control mechanisms for monitoring or adjusting material or environmental conditions. The article processing unit can, in whole or in part, support a vacuum or inert gas atmosphere to reduce unwanted chemical interactions as well as to mitigate the risks of fire or explosion (especially with reactive metals).

Control processor 150 can be connected to control any components of additive manufacturing system 100. The control processor 150 can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor can be a single central controller, or alternatively, can include one or more independent control systems. The controller processor 150 is provided with an interface to allow input of manufacturing instructions. Use of a wide range of sensors allows various feedback control mechanisms that improve quality, manufacturing throughput, and energy efficiency.

Figure 1B:
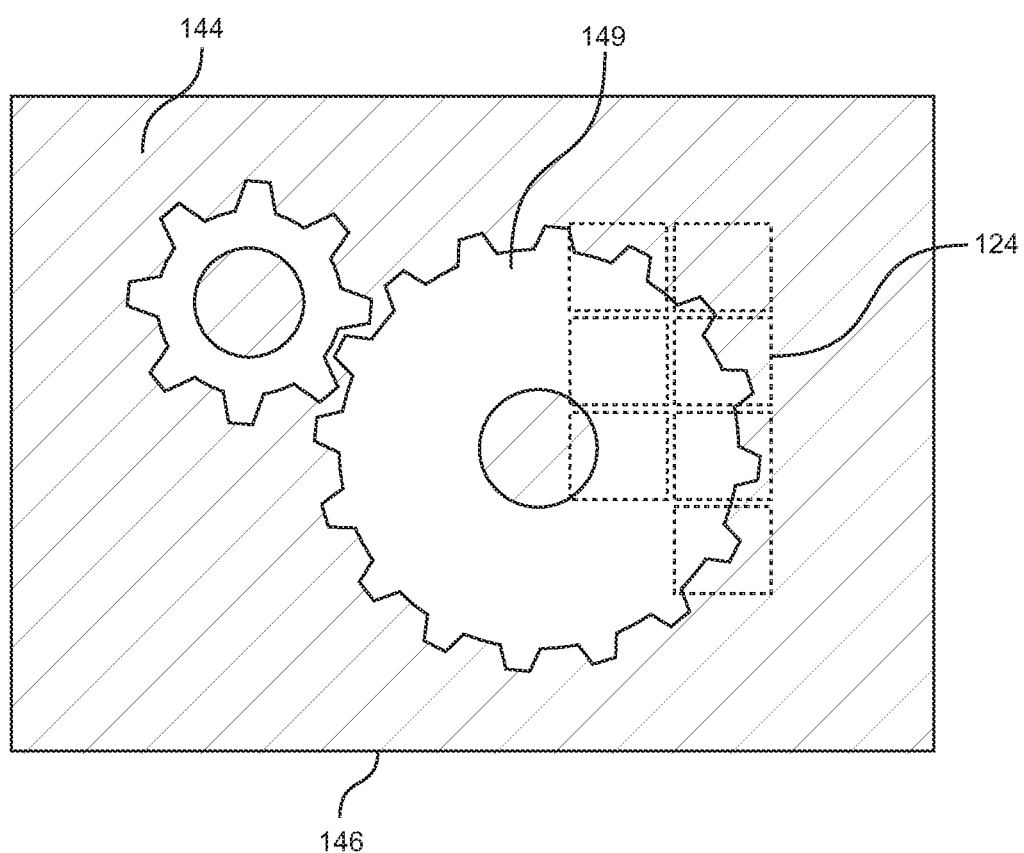
FIG. 1B is a top view of a structure being formed on an additive manufacturing system.

FIG. 1B is a cartoon illustrating a bed 146 that supports material 144. Using a series of sequentially applied, two-dimensional patterned energy beam images (squares in dotted outline 124), a structure 149 is additively manufactured. As will be understood, image patterns having non-square boundaries can be used, overlapping or interpenetrating images can be used, and images can be provided by two or more energy patterning systems. In other embodiments, images can be formed in conjunction with directed electron or ion beams, or with printed or selective spray systems.

Figure 2:
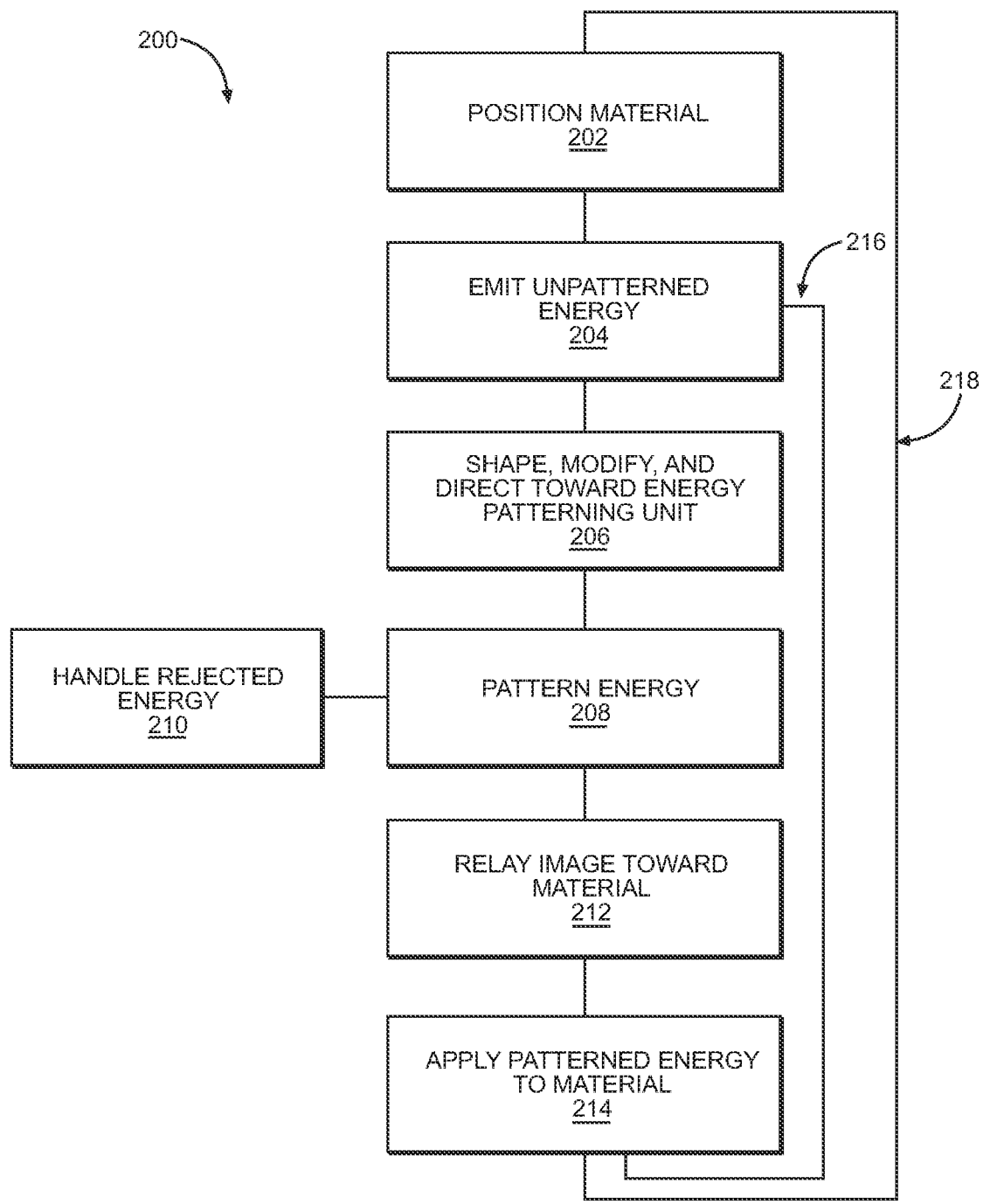
FIG. 2 illustrates an additive manufacturing method.

FIG. 2 is a flow chart illustrating one embodiment of an additive manufacturing process supported by the described optical and mechanical components. In step 202, material is positioned in a bed, chamber, or other suitable support. The material can be a powder capable of being melted, fused, sintered, induced to change crystal structure, have stress patterns influenced, or otherwise chemically or physically modified to form structures with desired properties.

In step 204, unpatterned energy is emitted by one or more energy emitters, including but not limited to solid state or semiconductor lasers, or electrical power supply flowing electrons down a wire. In step 206, the unpatterned energy is shaped and modified (e.g. intensity modulated or focused). In step 208, this unpatterned energy is patterned, with energy not forming a part of the pattern being handled in step 210 (this can include conversion to waste heat, or recycling as patterned or unpatterned energy). In step 212, the patterned energy, now forming a two-dimensional image is relayed toward the material. In step 214, the image is applied to the material, building a portion of a 3D structure. These steps can be repeated (loop 218) until the image (or different and subsequent image) has been applied to all necessary regions of a top layer of the material. When application of energy to the top layer of the material is finished, a new layer can be applied (loop 216) to continue building the 3D structure. These process loops are continued until the 3D structure is complete, when remaining excess material can be removed or recycled.

Figure 3A:
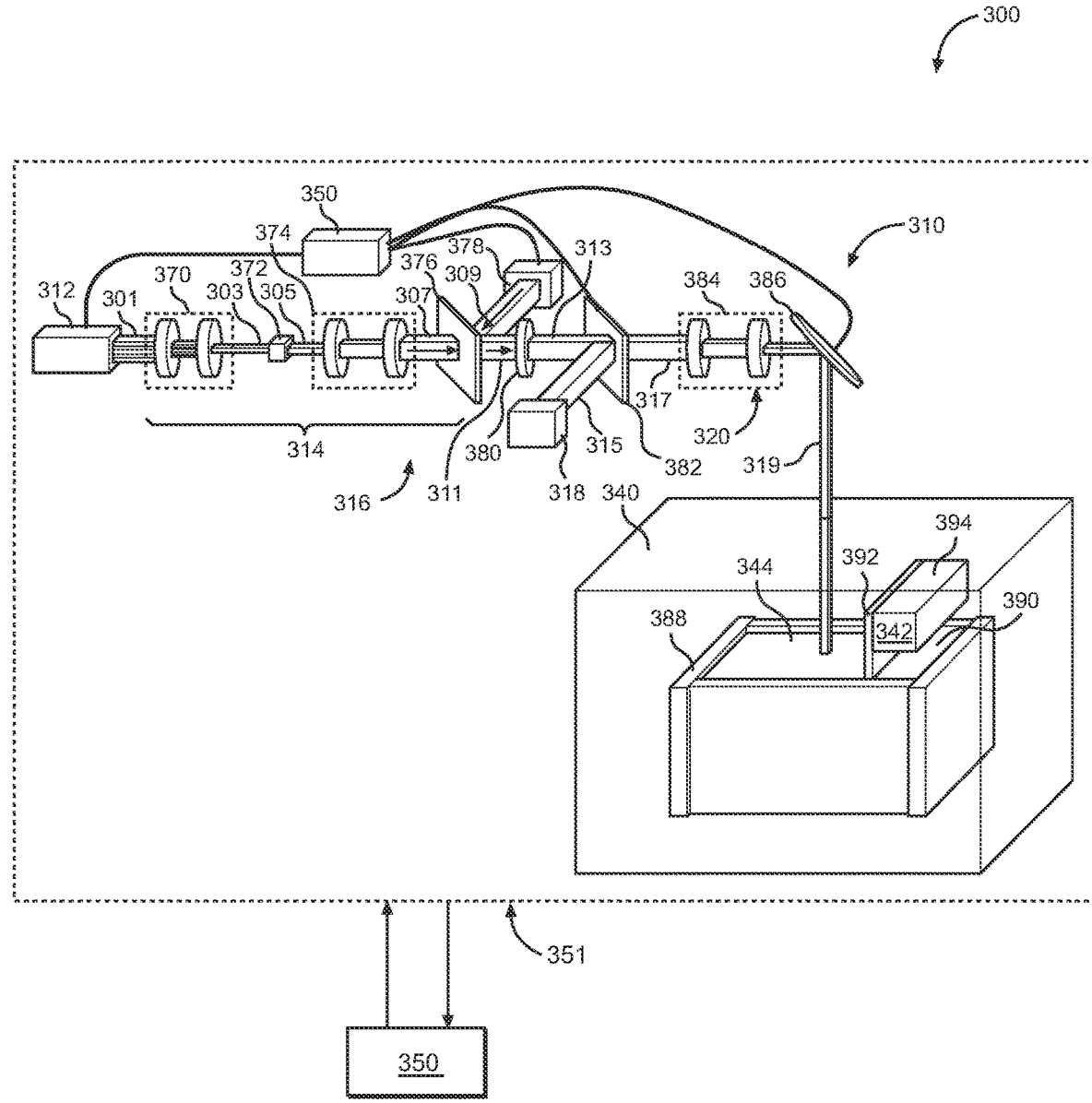
FIG. 3A is a cartoon illustrating an additive manufacturing system including lasers.

FIG. 3A is one embodiment of an additive manufacturing system 300 that uses multiple semiconductor lasers as part of an energy patterning system 310. A control processor 350 can be connected to variety of sensors, actuators, heating or cooling systems, monitors, and controllers to coordinate operation of multiple lasers 312, light patterning unit 316, and image relay 320, as well as any other component of system 300. These connections are generally indicated by a dotted outline 351 surrounding components of system 300. As will be appreciated, connections can be wired or wireless, continuous or intermittent, and include capability for feedback (for example, thermal heating can be adjusted in response to sensed temperature). The multiple lasers 312 can emit a beam 301 of light at a 1000 nm wavelength that, for example, is 90 mm wide by 20 mm tall. The beam 301 is resized by imaging optics 370 to create beam 303. Beam 303 is 6 mm wide by 6 mm tall, and is incident on light homogenization device 372 which blends light together to create blended beam 305. Beam 305 is then incident on imaging assembly 374 which reshapes the light into beam 307 and is then incident on hot cold mirror 376. The mirror 376 allows 1000 nm light to pass, but reflects 450 nm light. A light projector 378 capable of projecting low power light at 1080p pixel resolution and 450 nm emits beam 309, which is then incident on hot cold mirror 376. Beams 307 and 309 overlay in beam 311, and both are imaged onto optically addressed light valve 380 in a 20 mm wide, 20 mm tall image. Images formed from the homogenizer 372 and the projector 378 are recreated and overlaid on light valve 380.

The optically addressed light valve 380 is stimulated by the light (typically ranging from 400-500 nm) and imprints a polarization rotation pattern in transmitted beam 313 which is incident upon polarizer 382. The polarizer 382 splits the two polarization states, transmitting p-polarization into beam 317 and reflecting s-polarization into beam 315 which is then sent to a beam dump 318 that handles the rejected energy. As will be understood, in other embodiments the polarization could be reversed, with s-polarization formed into beam 317 and reflecting p-polarization into beam 315. Beam 317 enters the final imaging assembly 320 which includes optics 384 that resize the patterned light. This beam reflects off of a movable mirror 386 to beam 319, which terminates in a focused image applied to material bed 344 in an article processing unit 340. The depth of field in the image selected to span multiple layers, providing optimum focus in the range of a few layers of error or offset.

The bed 390 can be raised or lowered (vertically indexed) within chamber walls 388 that contain material 344 dispensed by material dispenser 342. In certain embodiments, the bed 390 can remain fixed, and optics of the final imaging assembly 320 can be vertically raised or lowered. Material distribution is provided by a sweeper mechanism 392 that can evenly spread powder held in hopper 394, being able to provide new layers of material as needed. An image 6 mm wide by 6 mm tall can be sequentially directed by the movable mirror 386 at different positions of the bed.

When using a powdered ceramic or metal material in this additive manufacturing system 300, the powder can be spread in a thin layer, approximately 1-3 particles thick, on top of a base substrate (and subsequent layers) as the part is built. When the powder is melted, sintered, or fused by a patterned beam 319, it bonds to the underlying layer, creating a solid structure. The patterned beam 319 can be operated in a pulsed fashion at 40 Hz, moving to the subsequent 6 mm×6 mm image locations at intervals of 10 ms to 0.5 ms (with 3 to 0.1 ms being desirable) until the selected patterned areas of powder have been melted. The bed 390 then lowers itself by a thickness corresponding to one layer, and the sweeper mechanism 392 spreads a new layer of powdered material. This process is repeated until the 2D layers have built up the desired 3D structure. In certain embodiments, the article processing unit 340 can have a controlled atmosphere. This allows reactive materials to be manufactured in an inert gas, or vacuum environment without the risk of oxidation or chemical reaction, or fire or explosion (if reactive metals are used).

Figure 3B:
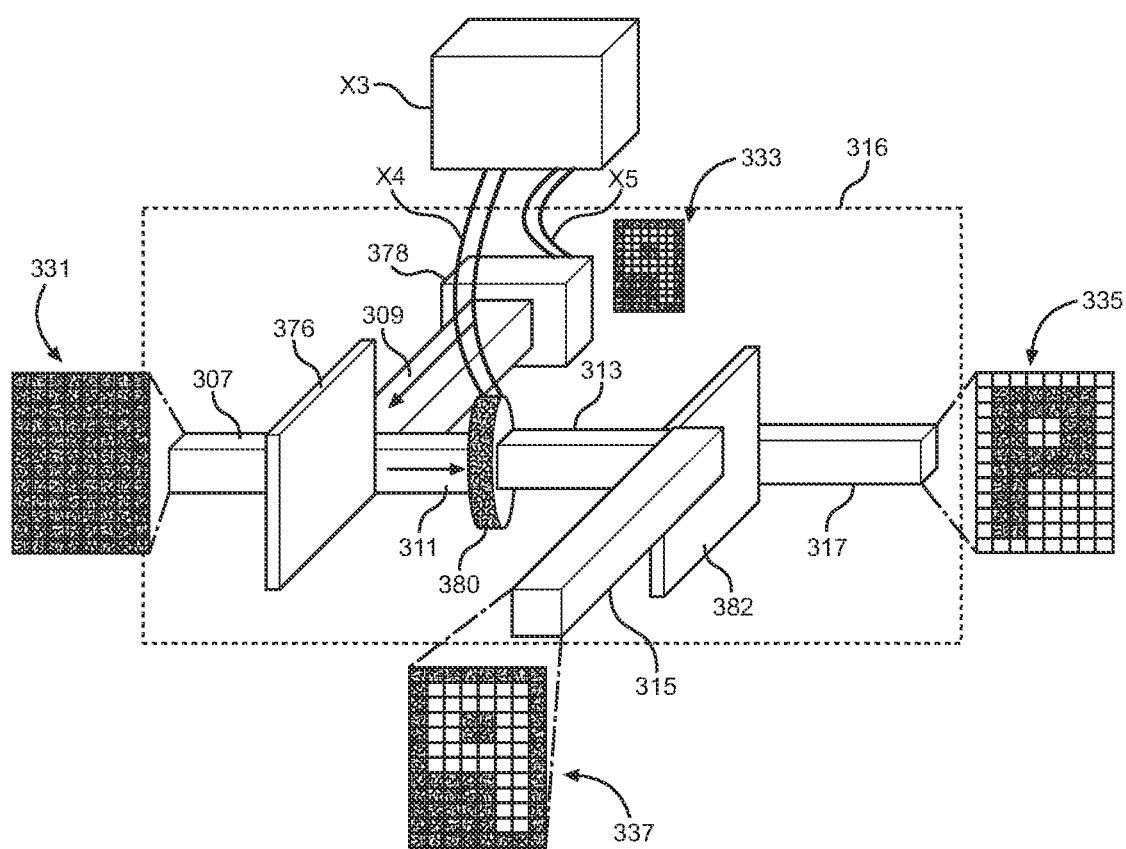
FIG. 3B is a detailed description of the light patterning unit shown in FIG. 3A.

FIG. 3B illustrates in more detail operation of the light patterning unit 316 of FIG. 3A. As seen in FIG. 3B, a representative input pattern 333 (here seen as the numeral "9") is defined in an 8×12 pixel array of light projected as beam 309 toward mirror 376. Each grey pixel represents a light filled pixel, while white pixels are unlit. In practice, each pixel can have varying levels of light, including light-free, partial light intensity, or maximal light intensity. Unpatterned light 331 that forms beam 307 is directed and passes through a hot/cold mirror 376, where it combines with patterned beam 309. Patterned beam 309 is generated by light projector 378 which is controlled by computer X3 by cabling X5. After reflection by the hot/cold mirror 376, the patterned light beam 311 formed from overlay of beams 307 and 309 in beam 311, and both are imaged onto optically addressed light valve 380. The optically addressed light valve 380, which would rotate the polarization state of unpatterned light 331, is stimulated by the patterned light beam 309/311, and electrical signal coming from computer X3 by cabling X4, to selectively not rotate the polarization state of polarized light 307/311 in the pattern of the numeral "9" into beam 313. The unrotated light representative of pattern 333 in beam 313 is then allowed to pass through polarizer mirror 382 resulting in beam 317 and pattern 335. Polarized light in a second rotated state is rejected by polarizer mirror 382, into beam 315 carrying the negative pixel pattern 337 consisting of a light-free numeral "9".

Other types of light valves can be substituted or used in combination with the described light valve. Reflective light valves, or light valves base on selective diffraction or refraction can also be used. In certain embodiments, non-optically addressed light valves can be used. These can include but are not limited to electrically addressable pixel elements, movable mirror or micro-mirror systems, piezo or micro-actuated optical systems, fixed or movable masks, or shields, or any other conventional system able to provide high intensity light patterning. For electron beam patterning, these valves may selectively emit electrons based on an address location, thus imbuing a pattern on the beam of electrons leaving the valve.

Figure 3C:
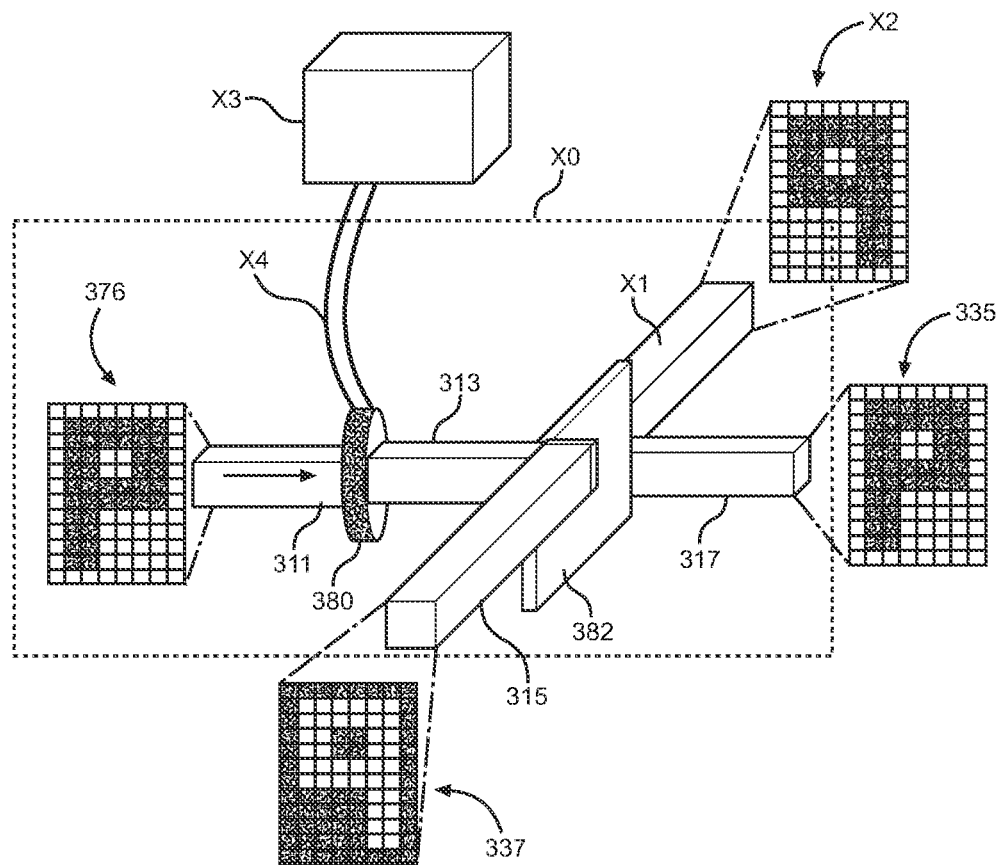
FIG. 3C is one embodiment of an additive manufacturing system with a "switchyard" for directing and repatterning light using multiple image relays.

FIG. 3C illustrates the detail and operation of an energy switching unit X0. As seen in FIG. 3C, a beam of light 311, carrying a representative input pattern 376 (here seen as the numeral "9" in an 8×12 pixel array) in the s-polarization state is incident on a single pixel liquid crystal (LC) cell 380. The LC cell 380 which, if desired, would rotate the polarization state of beam 311, is electrically stimulated computer X3 though cabling X4, to selectively rotate the polarization state of polarized light 311 into p-polarization state in beam 313 which would then pass the entire beam through polarizer element 382 into beam 317 carrying image information 335. Alternatively the LC cell 380 could be directed by computer X3 through cabling X4 to not rotate the polarization state of beam 311, preserving the polarization state of s-polarization in beam 313, causing a reflection into beam 315 carrying image information 337. The polarizer element 382 can also be used to receive light from source beam X1 carrying image information X2. The routing of beam X1 is entirely passive based on its polarization state, if X1 is s-pol it will reflect into beam 317, or alternatively if it is p-pol it will transmit into beam 315.

Other types of energy switching devices can be substituted or used in combination with the described LC cell.

Reflective LC cells, or energy switching devices base on mechanical movements such as a move-able mirror, or selective refraction can also be used, piezo or micro-actuated optical systems, fixed or movable masks, or shields, or any other conventional system able to provide high intensity energy switching. For electron beams these switching mechanisms may consist of large EM field arrays directing the beam to different channels or routes.

Figure 3D:
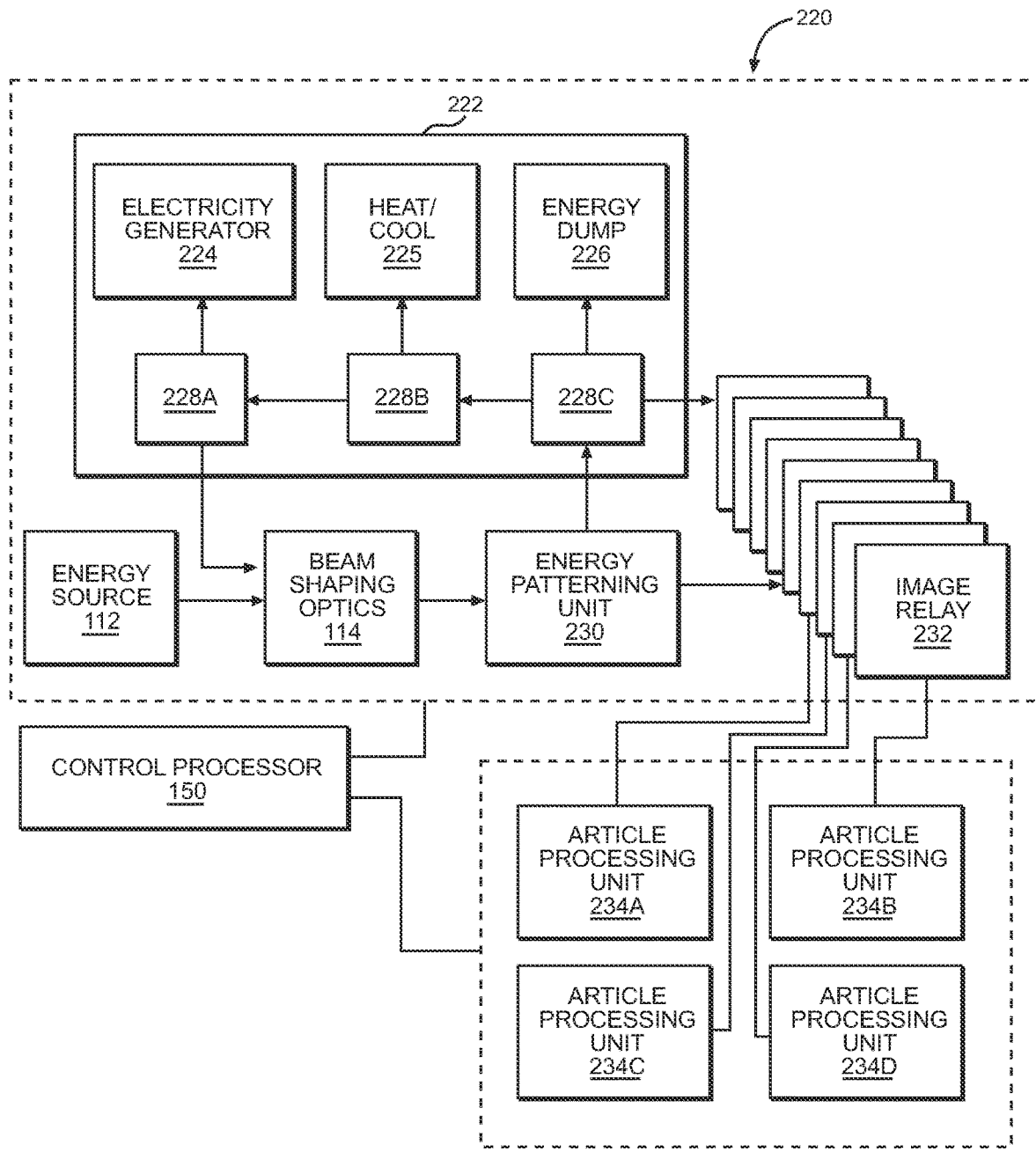
FIG. 3D illustrates a switchyard system supporting reuse of patterned two-dimensional energy.

FIG. 3D is one embodiment of an additive manufacturing system that includes a switchyard system enabling reuse of patterned two-dimensional energy. Similar to the embodiment discussed with respect to FIG. 1A, an additive manufacturing system 220 has an energy patterning system with an energy source 112 that directs one or more continuous or intermittent energy beam(s) toward beam shaping optics 114. After shaping, the beam is two-dimensionally patterned by an energy patterning unit 230, with generally some energy being directed to a rejected energy handling unit 222. Patterned energy is relayed by one of multiple image relays 232 toward one or more article processing units 234A, 234B, 234C, or 234D, typically as a two-dimensional image focused near a movable or fixed height bed. The bed (with optional walls) can form a chamber containing material dispensed by material dispenser. Patterned energy, directed by the image relays 232, can melt, fuse, sinter, amalgamate, change crystal structure, influence stress patterns, or otherwise chemically or physically modify the dispensed material to form structures with desired properties.

In this embodiment, the rejected energy handling unit has multiple components to permit reuse of rejected patterned energy. Relays 228A, 228B, and 228C can respectively transfer energy to an electricity generator 224, a heat/cool thermal management system 225, or an energy dump 226. Optionally, relay 228C can direct patterned energy into the image relay 232 for further processing. In other embodiments, patterned energy can be directed by relay 228C, to relay 228B and 228A for insertion into the energy beam(s) provided by energy source 112. Reuse of patterned images is also possible using image relay 232. Images can be redirected, inverted, mirrored, sub-patterned, or otherwise transformed for distribution to one or more article processing units. 234A-D. Advantageously, reuse of the patterned light can improve energy efficiency of the additive manufacturing process, and in some cases improve energy intensity directed at a bed, or reduce manufacture time.

FIG. 3D is a cartoon 235 illustrating a simple geometrical transformation of a rejected energy beam for reuse. An input pattern 236 is directed into an image relay 237 capable of providing a mirror image pixel pattern 238. As will be appreciated, more complex pixel transformations are possible, including geometrical transformations, or pattern remapping of individual pixels and groups of pixels. Instead of being wasted in a beam dump, this remapped pattern can be directed to an article processing unit to improve manufacturing throughput or beam intensity.

Figure 3E:
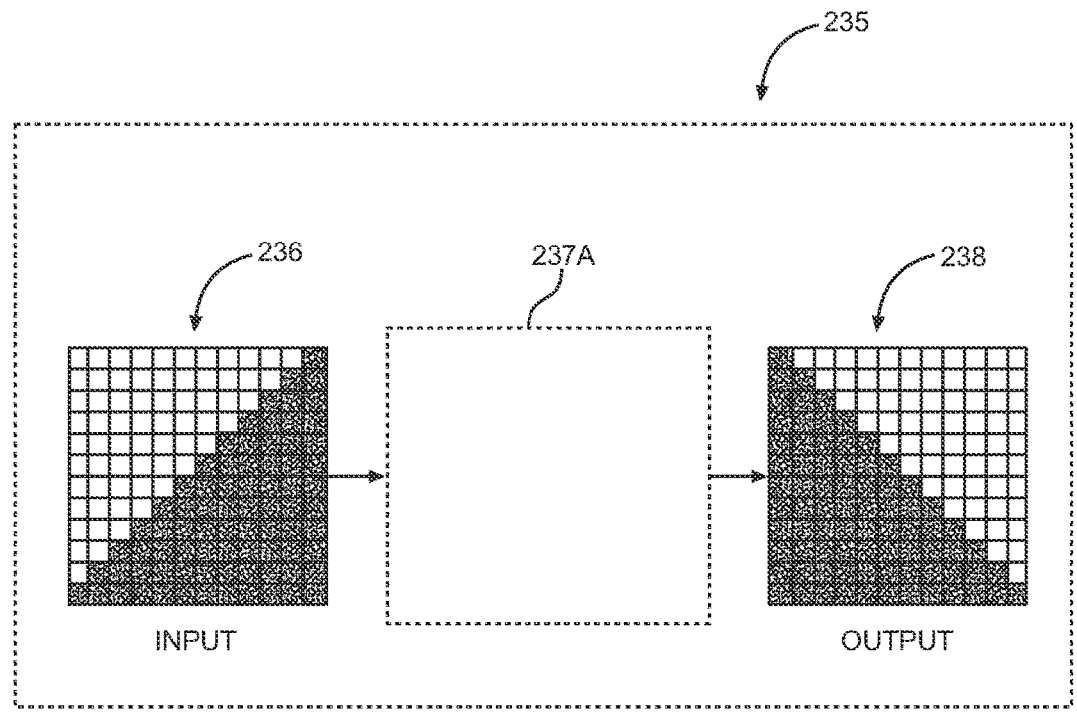
FIG. 3E illustrates a mirror image pixel remapping.
Figure 3F:
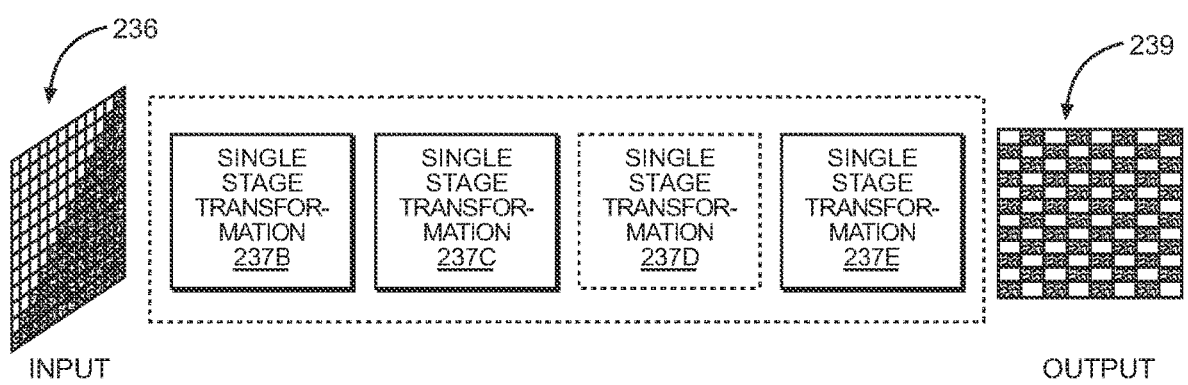
FIG. 3F illustrates a series of image transforming image relays for pixel remapping.

FIG. 3E is a cartoon 235 illustrating multiple transformations of a rejected energy beam for reuse. An input pattern 236 is directed into a series of image relays 237B-E capable of providing a pixel pattern 238.

In another embodiment supporting light recycling and reuse, multiplex multiple beams of light from one or more light sources are provided. The multiple beams of light may be reshaped and blended to provide a first beam of light. A spatial polarization pattern may be applied on the first beam of light to provide a second beam of light. Polarization states of the second beam of light may be split to reflect a third beam of light, which may be reshaped into a fourth beam of light. The fourth beam of light may be introduced as one of the multiple beams of light to result in a fifth beam of light. In effect, this or similar systems can reduce energy costs associated with an additive manufacturing system. By collecting, beam combining, homogenizing and re-introducing unwanted light rejected by a spatial polarization valve or light valve operating in polarization modification mode, overall transmitted light power can potentially be unaffected by the pattern applied by a light valve. This advantageously results in an effective re-distribution of the light passing through the light valve into the desired pattern, increasing the light intensity proportional to the amount of area patterned.

Combining beams from multiple lasers into a single beam is one way to increase beam intensity. In one embodiment, multiple light beams, each having a distinct light wavelength, can be combined using either wavelength selective mirrors or diffractive elements. In certain embodiments, reflective optical elements that are not sensitive to wavelength dependent refractive effects can be used to guide a multiwavelength beam.

Patterned light can be directed using movable mirrors, prisms, diffractive optical elements, or solid state optical systems that do not require substantial physical movement. In one embodiment, a magnification ratio and an image distance associated with an intensity and a pixel size of an incident light on a location of a top surface of a powder bed can be determined for an additively manufactured, three-dimensional (3D) print job. One of a plurality of lens assemblies can be configured to provide the incident light having the magnification ratio, with the lens assemblies both a first set of optical lenses and a second sets of optical lenses, and with the second sets of optical lenses being swappable from the lens assemblies. Rotations of one or more sets of mirrors mounted on compensating gantries and a final mirror mounted on a build platform gantry can be used to direct the incident light from a precursor mirror onto the location of the top surface of the powder bed. Translational movements of compensating gantries and the build platform gantry are also able to ensure that distance of the incident light from the precursor mirror to the location of the top surface of the powder bed is substantially equivalent to the image distance. In effect, this enables a quick change in the optical beam delivery size and intensity across locations of a build area for different powdered materials while ensuring high availability of the system.

In certain embodiments, a plurality of build chambers, each having a build platform to hold a powder bed, can be used in conjunction with multiple optical-mechanical assemblies arranged to receive and direct the one or more incident energy beams into the build chambers. Multiple chambers allow for concurrent printing of one or more print jobs inside one or more build chambers. In other embodiments, a removable chamber sidewall can simplify removal of printed objects from build chambers, allowing quick exchanges of powdered materials. The chamber can also be equipped with an adjustable process temperature controls.

In another embodiment, one or more build chambers can have a build chamber that is maintained at a fixed height, while optics are vertically movable. A distance between final optics of a lens assembly and a top surface of powder bed a may be managed to be essentially constant by indexing final optics upwards, by a distance equivalent to a thickness of a powder layer, while keeping the build platform at a fixed height. Advantageously, as compared to a vertically moving the build platform, large and heavy objects can be more easily manufactured, since precise micron scale movements of the ever changing mass of the build platform are not needed. Typically, build chambers intended for metal powders with a volume more than ~0.1-0.2 cubic meters (i.e., greater than 100-200 liters or heavier than 500-1,000 kg) will most benefit from keeping the build platform at a fixed height.

In one embodiment, a portion of the layer of the powder bed may be selectively melted or fused to form one or more temporary walls out of the fused portion of the layer of the powder bed to contain another portion of the layer of the powder bed on the build platform. In selected embodiments, a fluid passageway can be formed in the one or more first walls to enable improved thermal management.

Improved powder handling can be another aspect of an improved additive manufacturing system. A build platform supporting a powder bed can be capable of tilting, inverting, and shaking to separate the powder bed substantially from the build platform in a hopper. The powdered material forming the powder bed may be collected in a hopper for reuse in later print jobs. The powder collecting process may be automated, and vacuuming or gas jet systems also used to aid powder dislodgement and removal Some embodiments of the disclosed additive manufacturing system can be configured to easily handle parts longer than an available chamber. A continuous (long) part can be sequentially advanced in a longitudinal direction from a first zone to a second zone. In the first zone, selected granules of a granular material can be amalgamated. In the second zone, unamalgamated granules of the granular material can be removed. The first portion of the continuous part can be advanced from the second zone to a third zone, while a last portion of the continuous part is formed within the first zone and the first portion is maintained in the same position in the lateral and transverse directions that the first portion occupied within the first zone and the second zone. In effect, additive manufacture and clean-up (e.g., separation and/or reclamation of unused or unamalgamated granular material) may be performed in parallel (i.e., at the same time) at different locations or zones on a part conveyor, with no need to stop for removal of granular material and/or parts.

In another embodiment, additive manufacturing capability can be improved by use of an enclosure restricting an exchange of gaseous matter between an interior of the enclosure and an exterior of the enclosure. An airlock provides an interface between the interior and the exterior; with the interior having multiple additive manufacturing chambers, including those supporting power bed fusion. A gas management system maintains gaseous oxygen within the interior at or below a limiting oxygen concentration, increasing flexibility in types of powder and processing that can be used in the system.

In another manufacturing embodiment, capability can be improved by having a 3D printer contained within an enclosure, the printer able to create a part having a weight greater than or equal to 2,000 kilograms. A gas management system may maintain gaseous oxygen within the enclosure at concentrations below the atmospheric level. In some embodiments, a wheeled vehicle may transport the part from inside the enclosure, through an airlock, since the airlock operates to buffer between a gaseous environment within the enclosure and a gaseous environment outside the enclosure, and to a location exterior to both the enclosure and the airlock.

Other manufacturing embodiments involve collecting powder samples in real-time in a powder bed fusion additive manufacturing system. An ingester system is used for in-process collection and characterizations of powder samples. The collection may be performed periodically and the results of characterizations result in adjustments to the powder bed fusion process. The ingester system can optionally be used for one or more of audit, process adjustments or actions such as modifying printer parameters or verifying proper use of licensed powder materials.

Yet another improvement to an additive manufacturing process can be provided by use of a manipulator device such as a crane, lifting gantry, robot arm, or similar that allows for the manipulation of parts that would be difficult or impossible for a human to move is described. The manipulator device can grasp various permanent or temporary additively manufactured manipulation points on a part to enable repositioning or maneuvering of the part.

According to the present disclosure, an optical system capable of recycling rejected, unwanted and/or unused light is provided. Recycling and re-using unwanted light may increase the intensity of laser emitted light that is provided to a build platform. Moreover, recycling and re-using unwanted light may reduce energy costs associated with the system. By collecting, beam combining, homogenizing and re-introducing unwanted light rejected by a spatial polarization valve or light valve operating in polarization modification mode, overall transmitted light power can potentially be unaffected by the pattern applied by the light valve. This advantageously results in an effective re-distribution of the light passing through the light valve into the desired pattern, thereby increasing the light intensity proportional to the amount of area patterned. This has particular use with regards to advanced additive manufacturing methods using powder bed fusion techniques (such as those described herein with respect to FIGS. 1A-3B) and in particular with laser additive manufacturing. This is because increased intensity can allow for shorter dwell times and faster print rates to increase material conversion rate while maintaining efficiency.

By way of a light valve or light modulator, a spatial pattern of light can be imprinted on a beam of light. When optical intensity is of a concern or figure of merit of the optical system, conservation of system power is a priority. Liquid crystal based devices are capable of patterning a polarized beam by selectively rotating "pixels" in the beam and then passing the beam through a polarizer to separate the rotated and non-rotated pixels. Instead of dumping the rejected polarization state, the photons may be combined and homogenized with the original input beam(s) to the light valve. The optical path may be divided into three segments, including: 1) optical transmission fraction between light source(s) and light valve (denoted as "$f_1$" herein), 2) optical transmission fraction between light valve and source, e.g., accounting for the return loop (denoted as "$f_2$" herein), and fraction of the light valve that is patterned for the desired transmission state (denoted as "$f_p$" herein). The final light power may be expressed as follows in Equation 1:

$$P = P_0 \frac{(f_1 f_p)}{1 - f_1 f_2 (1 - f_p)} \qquad \text{Equation 1}$$

Thus, according to Equation 1, as the transmission fractions $f_1$ and $f_2$ are increased to a full value of 1, the final power equals the initial power regardless of fraction of the beam that is patterned. The final intensity is increased relative to the initial intensity proportional to the amount of area patterned. This increased intensity requires compensation in the dwell time, however this is known a priori.

One example implementation of this concept is in the field of additive manufacturing where lasers are used to melt a powdered layer of material. Without beam recycling, as the patterned area fill factor decreases, the material print rate also decreases, thereby lowering the overall mass production rate of the printer. Compensation in dwell time due to recycling of the light is such that for higher intensities, the dwell time is shortened in a non-linear fashion. Shorter dwell times tend to result in ever faster print rates and faster overall mass conversion rates. This ability to increase the rate of material printing for low fill factor print areas enables an additive manufacturing machine to maintain high levels of powder to engineered shape conversion rates, hence resulting in a higher performance product.

A further example implementation of this concept is in the use of a bar of light which sweeps over the build platform and is modulated on and off as swept to create a two-dimensional (2D) solid layer from the powder substrate. The use of recycled light in conjunction with this example is novel. The use of a bar, swept over the entire build platform, requires that it needs to be capable of always printing at 100% fill factor. Typically, however, only 10-33% of the build platform is ever used. This low fill factor means that, on average, the capital equipment in laser power is 3 to 10 times oversized for the system. If, however, the light can be recycled, and bar sweep speed modified to match required dwell times proportional to the fill factor, then the print speed can be increased such that it is closer to the optimum fill factor efficiency. In such cases the capital equipment may be fully utilized. The ability to print with a swept bar of light enables unidirectional printing, thereby simplifying the gantry system required to move the light around. Such ability also allows for easy integration of the powder sweeping mechanism.

A further example implementation of the print bar concept includes a powder distribution system that follows the bar, laying down the next layer of powder as the previous layer is printed. Advantageously, this may minimize system down time.

Another example implementation of light recycling is to share light with one or more other print chambers. This example effectively makes the available laser light seem like an on-demand resource, much like electricity being available at a wall outlet.

As previously noted with respect to FIG. 2 and the related description, recycling light does not have to be limited to reuse of homogenized, pattern-free light beams. Reuse of patterned images is also possible, with rejected light patterns capable of being inverted, mirrored, sub-patterned, or otherwise transformed for distribution to one or more article processing units.

Figure 4A:
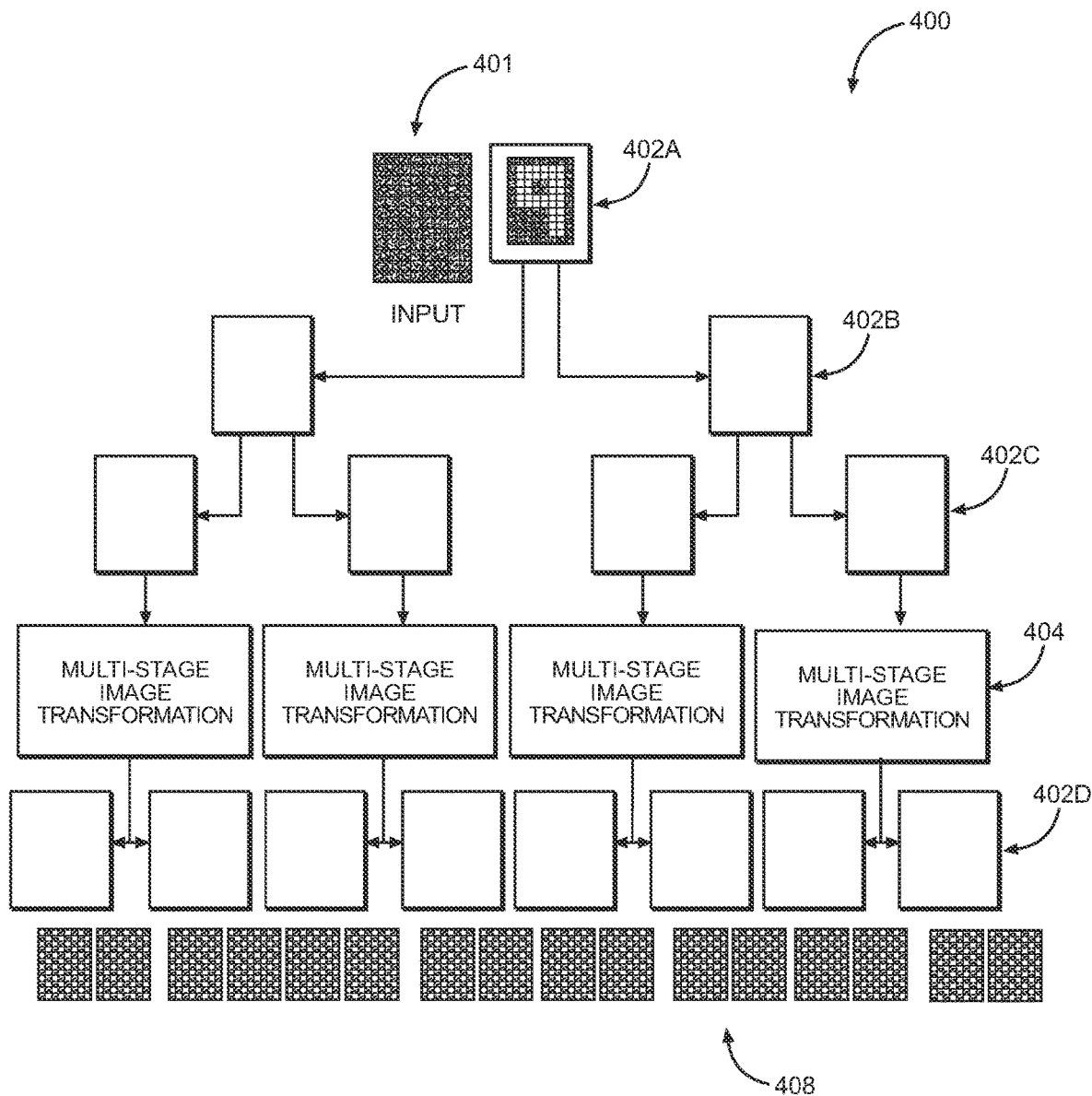
FIG. 4A is a diagram of a layout of an energy patterning binary tree system for laser light recycling in an additive manufacturing process in accordance with an embodiment of the present disclosure.

FIG. 4A is a cartoon illustrating an energy patterning binary tree system 400 able to generate $2^n$ images from one input 401 and $(2^n-1)$ patterning levels 402*a-d*. At each stage, a "positive" light pattern and a "negative" or rejected light pattern counterpart can be created and directed toward additional patterning units or as patterned output 408. Each light pattern can be further modified through multistage transformations 404 which can modify patterns, reduce intensity in selected pattern regions, or otherwise change light characteristics.

Figure 4B:
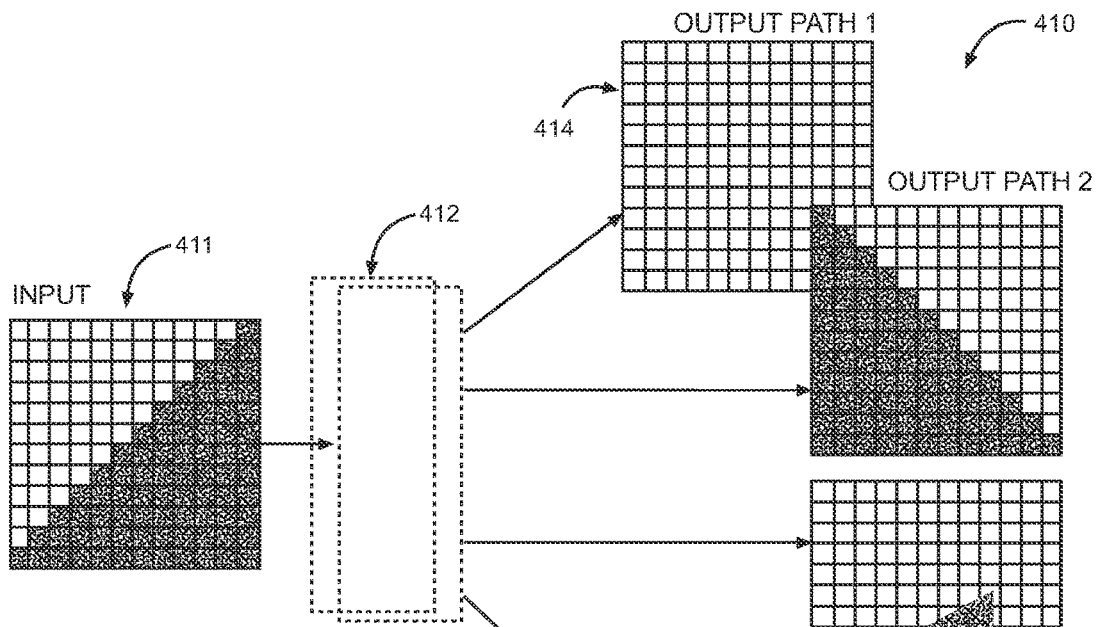
FIG. 4B is a diagram of illustrating pattern recycling from one input to multiple outputs.

FIG. 4B is a cartoon 410 illustrating pattern recycling from one input 411 to multiple outputs 414 by use of combined light patterning and steering mechanism 412. In this example, four output paths are provided, with a first possible output path having no patterned light, the second output path having a reduced light intensity pattern mirrored but otherwise identical to the input pattern 411, the third output path having a new pattern created by light pixel redirection, and the fourth output path having a significantly smaller and higher intensity pattern. As will be understood, these patterns are examples only, and a wide variety of output patterns that are smaller, larger, differently shaped, or have lower/higher light intensity patterns can be formed with suitable adjustments. In some embodiments, the output pattern can be modified by optical reflections, inversions, or the like of the whole input image, while in other embodiments, pixel block or individual pixel level adjustments are possible.

Figure 4C:
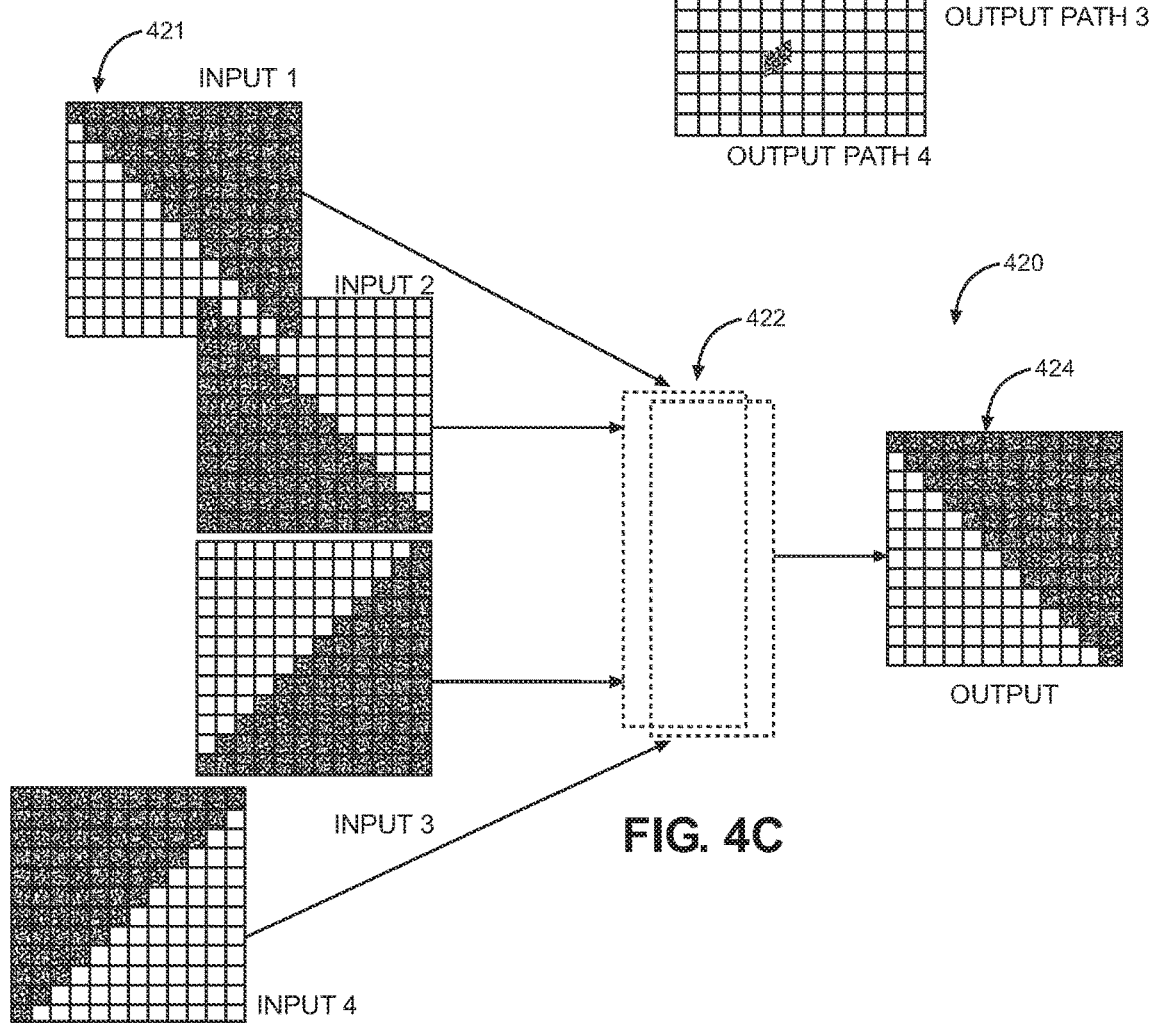
FIG. 4C is a diagram of illustrating pattern recycling from multiple inputs to one output.

FIG. 4C is a cartoon 420 illustrating pattern recycling from multiple inputs 421 to an output 424 by use of combined light patterning and steering mechanism 422. In this example, four patterned inputs are combined into a higher intensity output 424, by rotating or flipping light input patterns 2, 3, and 4 to match and combine with input pattern 1. Similar to cartoon 4B, it should be understood that these patterns are examples only, and whole image, pixel block, or individual pixel level modifications to pattern and light intensity are allowed.

Figure 4D:
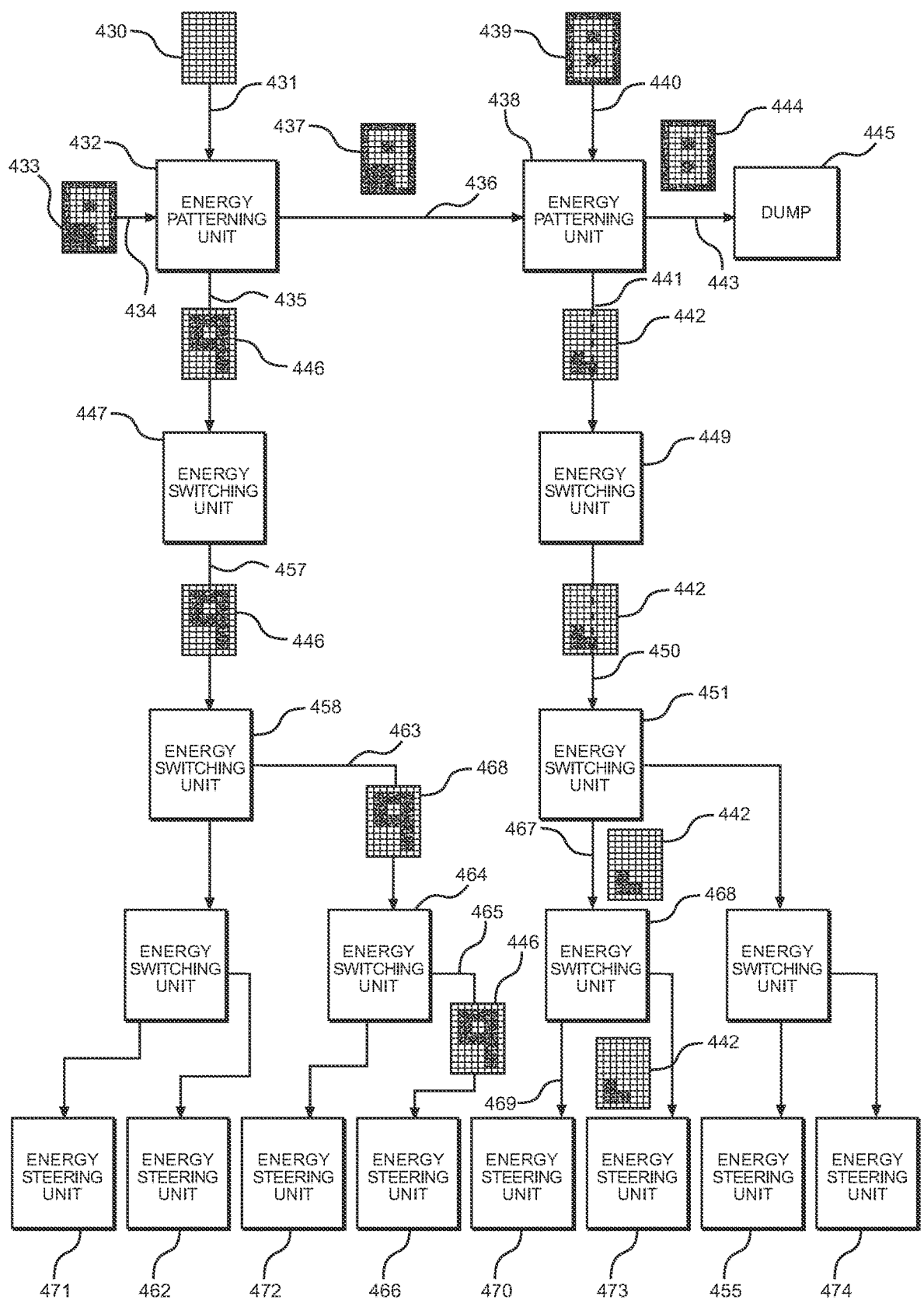
FIG. 4D is a schematic example of an implementation of the switchyard concept supporting two light valve patterning steps and beam re-direction where switching is available for at least some energy steering units.

FIG. 4D is a schematic example of an implementation of the switchyard concept for additive manufacturing detailing two light valve patterning steps and beam re-direction where each image can only access half of the energy steering units. In this example, one image can only access beam steering units 471, 462, 472, and 466 while a second image can access 470, 473, 455, and 474. In operation, un-patterned infra-red beam 430 in a s-polarization state is incident on energy patterning unit 432 (similar to, for example, light patterning unit 316 of FIG. 3B) which is addressed by patterned ultra-violet image 433 (here a representation of the number "9" in an 8×12 pixel format) from a projector via beam 434. Wherever the UV light is incident on the energy patterning unit, the polarization state of beam 431 containing image information 433 is maintained. Upon incidence with the polarizer element inside of 430, energy patterning unit 432 then splits the beam, directing the image 446 in the p-polarization state along beam 435 to energy switching unit 447 (as described, for example, by X0 in FIG. 3C). The image 437 in s-polarization state is then sent along beam 436 to the second energy patterning unit 438 which is addressed by a UV beam 440 containing image information 439. Energy patterning unit 438 sends the image 442 in the p-pol state along beam 441 to energy switching unit 449. The image 444 in s-pol from energy patterning unit 438 is sent along beam 443 to beam dump 445 where it is rejected or otherwise utilized.

The first image, as represented as 446 is incident on energy switching unit 447 which receives beam 435 containing image information 446 in the p-pol state and in this example, passes it un-altered to beam 457, still containing image information 446 and maintaining p-polarization, which is then incident on energy switching unit 458. Energy switching unit 458 receives beam 457 containing image information 446 and in this example, passes it to beam 463 converting to the s-polarization state, still containing image information 446, which is then incident on energy switching unit 464. Energy switching unit 464 receives beam 463 containing image information 446 and in this example, passes it to beam 465 maintaining the s-polarization state, still containing image information 446, which is then incident on energy steering unit 466. Energy steering unit 466, which could be a mechanical (rotational) galvanometer or other solid state or rotational device, then directs beam 465 to the desired tile location on the print bed in its range of motion.

The second image, as represented as 442 is incident on energy switching unit 449 which receives beam 441 containing image information 442 in the p-pol state and in this example, passes it un-altered to beam 450, still containing image information 442 and maintaining p-polarization, which is then incident on energy switching unit 451. Energy switching unit 451 receives beam 450 containing image information 442 and in this example, passes it to beam 467 maintaining p-polarization state, still containing image information 442, which is then incident on energy switching unit 468. Energy switching unit 468 receives beam 467 containing image information 442 and in this example, passes it to beam 469 maintaining the p-polarization state, still containing image information 442, which is then incident on energy steering unit 470. Energy steering unit 470, which could be a mechanical (rotational) galvanometer or other solid state or rotational device, then directs beam 469 to the desired tile location on the print bed in its range of motion. In this example, the image relay such as discussed in the disclosure with respect to at least FIG. 3D and FIGS. 5A-C occurs between beams 435/441 and the energy steering units. Lenses, mirrors, and other pre-, post, or intermediate optics are not shown in this FIG. 4D, but could be utilized as needed.

Figure 4E:
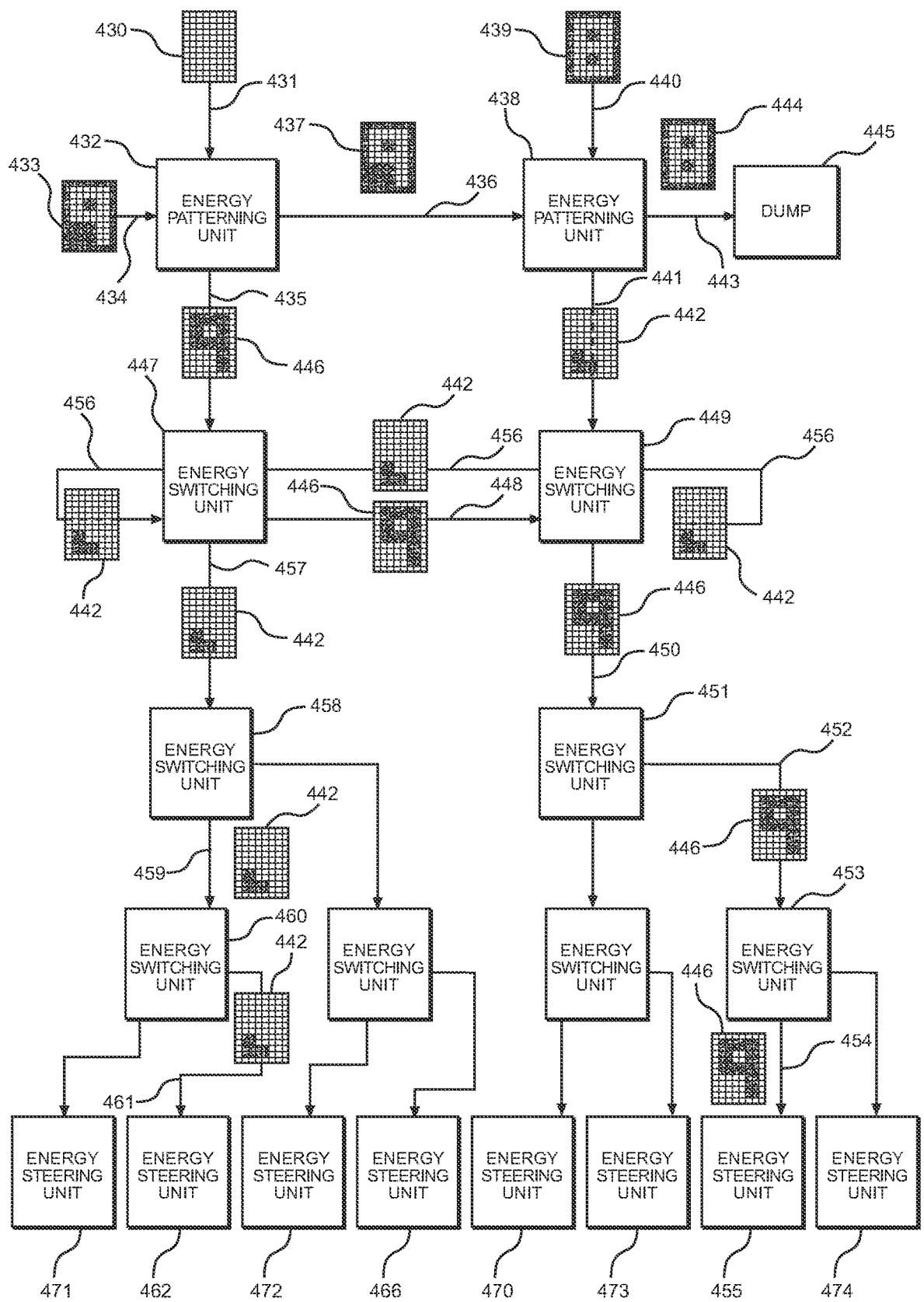
FIG. 4E is a schematic example of an implementation of the switchyard concept supporting two light valve patterning steps and beam re-direction where switching is available for all energy steering units.

FIG. 4E is a schematic example of an implementation of the switchyard concept detailing two light valve patterning steps and beam re-direction where switching is demonstrated to access the entirety of the energy steering units. In this example, one image can now access beam steering units 471, 462, 472, 466, 470, 473, 455, and 474. Un-patterned infra-red beam 430 in a s-polarization state is incident on energy patterning unit 432 (as described by 316 in FIG. 3B) which is addressed by patterned ultra-violet image 433 (here a representation of the number "9" in an 8×12 pixel format) from a projector via beam 434. Wherever the UV light is incident on the energy patterning unit, the polarization state of beam 431 containing image information 430 is maintained. Upon incidence with the polarizer element inside of 430, energy patterning unit 432 then splits the beam directing the image 446 in the p-polarization state along beam 435 to energy switching unit 447 (as described by X0 in FIG. 3C). The image 437 in s-polarization state is then sent along beam 436 to the second energy patterning unit 438 which is addressed by a UV beam 440 containing image information 439. Energy patterning unit 438 sends the image 442 in the p-pol state along beam 441 to energy switching unit 449. The image 444 in s-pol from energy patterning unit 438 is sent along beam 443 to beam dump 445 where it is rejected or otherwise utilized.

The first image, as represented as 446 is incident on energy switching unit 447 which receives beam 435 containing image information 446 in the p-pol state and in this example, modifies the polarization state to s-polarization causing switching to beam 448, still containing image information 446, which is then incident on energy switching unit 449. Energy switching unit 449 receives beam 448 containing image information 446 and in this example, passes it to beam 450 unaltered maintaining s-polarization state, still containing image information 446, which is then incident on energy switching unit 451 (this process is described in detail by the interaction of beam X1 with polarizer 382 into beam 317 in FIG. 3C). Energy switching unit 451 receives beam 450 containing image information 446 and in this example, passes it to beam 452 maintaining the s-polarization state, still containing image information 446, which is then incident on energy switching unit 453. Energy switching unit 453 receives beam 452 containing image information 446 and in this example, passes it to beam 454 maintaining the beam to the p-polarization state, still containing image information 446, which is then incident on energy steering unit 455. Energy steering unit 455, which could be a mechanical (rotational) galvanometer or other solid state or rotational device, then directs beam 454 to the desired tile location on the print bed in its range of motion.

The second image, as represented as 442 is incident on energy switching unit 449 which receives beam 441 containing image information 442 in the p-pol state and in this example, modifies the polarization state to s-polarization causing switching to beam 456, still containing image information 442, which is then incident on energy switching unit 447. Energy switching unit 447 receives beam 456 containing image information 442 and in this example, passes it to beam 457 unaltered maintaining s-polarization state, still containing image information 442, which is then incident on energy switching unit 458 (this process is described in detail by the interaction of beam X1 with polarizer 382 into beam 317 in FIG. 3C). Energy switching unit 458 receives beam 457 containing image information 442 and in this example, passes it to beam 459 modifying the beam to the p-polarization state, still containing image information 442, which is then incident on energy switching unit 460. Energy switching unit 460 receives beam 459 containing image information 442 and in this example, passes it to beam 461 modifying the beam to the s-polarization state, still containing image information 446, which is then incident on energy steering unit 462. Energy steering unit 462, which could be a mechanical (rotational) galvanometer or other solid state or rotational device, then directs beam 461 to the desired tile location on the print bed in its range of motion. In this example, the image relay such as discussed in the disclosure with respect to at least FIG. 3D and FIGS. 5A-C occurs between beams 435/441 and the energy steering units. Lenses, mirrors, and other pre-, post, or intermediate optics are not shown in this FIG. 4E, but could be utilized as needed.

Figure 5A:
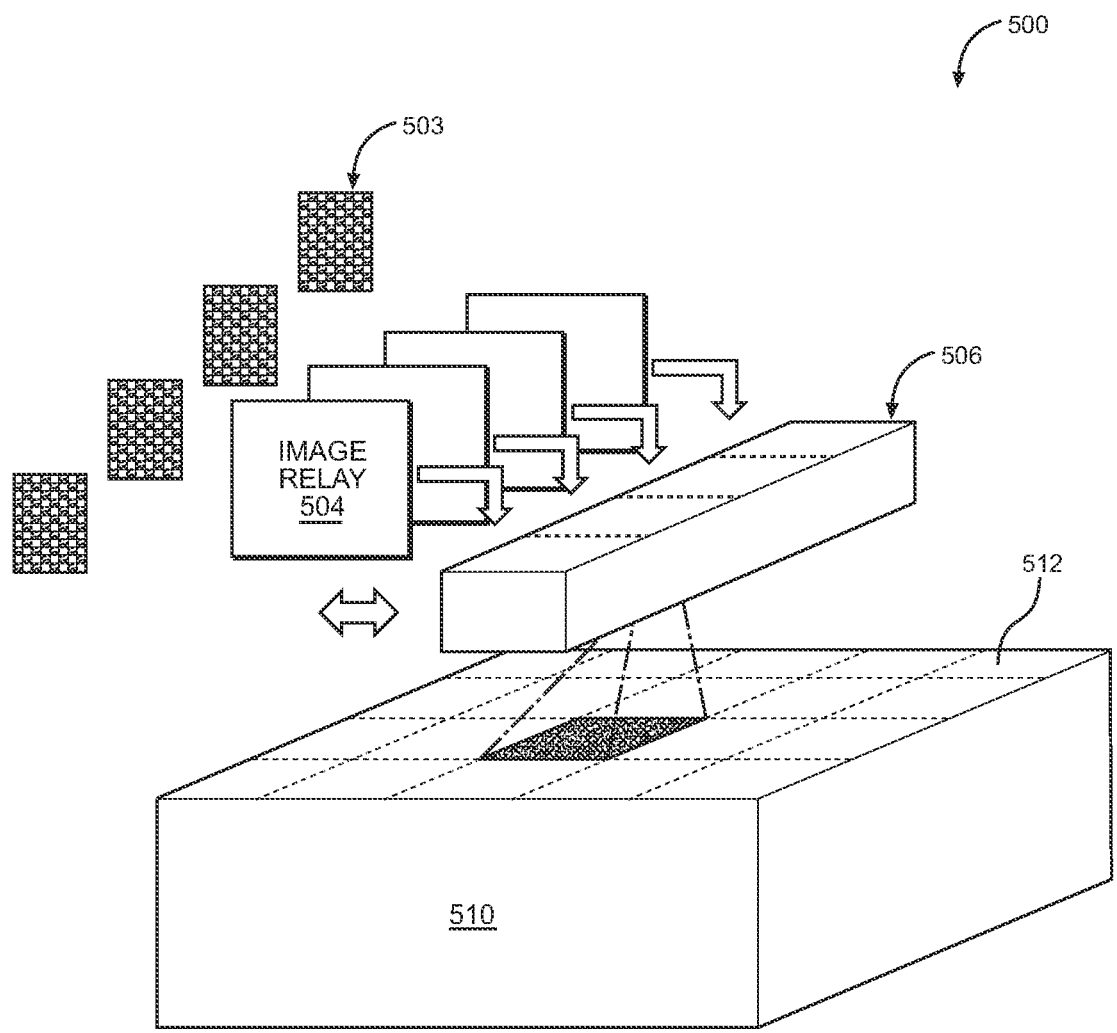
FIG. 5A is a cartoon illustrating area printing of multiple tiles using a solid-state system with a print bar.

FIG. 5A is a cartoon 500 illustrating area printing of multiple tiles using a print bar concept. The print bar 506 could contain galvanometer mirror sets, or a solid-state system that does not necessarily require move-able mirrors. Multiple input patterns 503 are redirected by multiple image relays 504 into a print bar 506 incorporating a solid-state array of image pipes and optics. The print bar 506 can be moved across powder bed 510 along a single axis as shown in the Figure, selectively irradiating one or more tiles 512. In other embodiments with larger powder beds, the print bar can be moved along both X and Y axes to cover the powder bed 510. In one embodiment, optics associated with the print bar can be fixed to support a single tile size, while in other embodiments, movable optics can be used to increase or reduce tile size, or to compensate for any Z-axis movement of the print bar. In another embodiment, patterned images can be created using recycled light patterns, including but not limited to an energy patterning binary tree system such as discussed with respect to FIG. 4A. In certain embodiments, multiple tiles can be simultaneously printed in a given time period. Alternatively, a subset of tiles can be printed at different times if available patterned energy, thermal issues, or other print bar configuration issues do not allow for complete utilization.

Figure 5B:
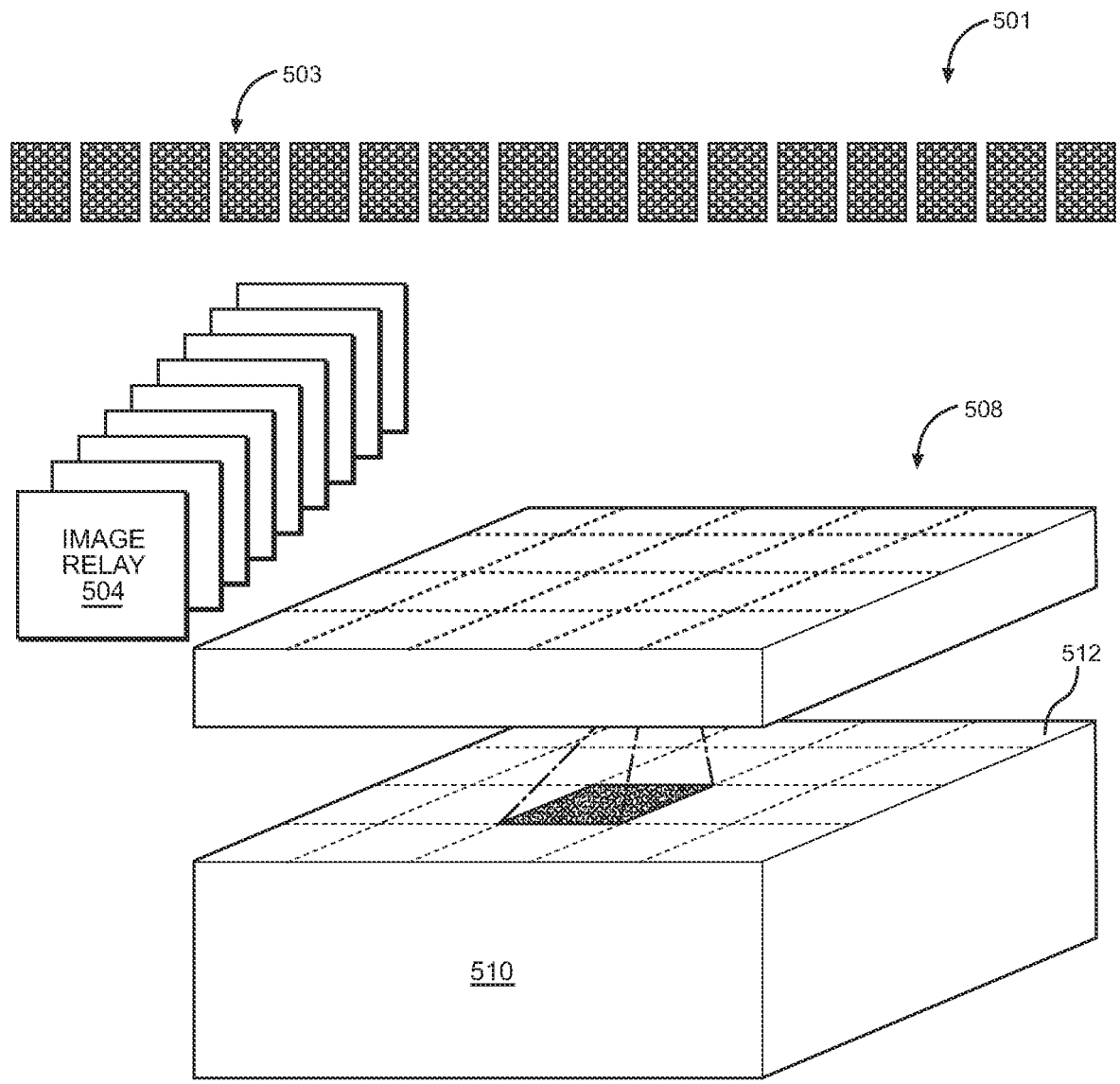
FIG. 5B is a cartoon illustrating area printing of multiple tiles using a solid-state system with a matrix sized to be coextensive with a powder bed.

FIG. 5B is a cartoon 501 illustrating area printing of multiple tiles using an overhead fixed arrays system composed of multiple beam steering units. Beam steering units as demarcated unit cells in 508 can be composed of moveable mirrors (galvanometers) or an alternative solid state beam steering system. Multiple input patterns 503 are redirected by multiple image relays 504 into a matrix 508 incorporating an array of optics. The matrix 508 is sized to be coextensive with the powder, and does not need be moved across powder bed 510. This substantially reduces errors associated with moving a print bar, and can simplify assembly and operation of the system. In one embodiment, optics associated with the matrix can be fixed to support a single tile size, while in other embodiments, movable optics can be used to increase or reduce tile size, or to compensate for any Z-axis movement of the matrix 508. Like the embodiment discusses with respect to FIG. 5A, patterned images can be created using recycled light patterns, including but not limited to an energy patterning binary tree system such as discussed with respect to FIG. 4A, 4D, or 4E. In certain embodiments, multiple tiles can be simultaneously printed in a given time period. Alternatively, a subset of tiles can be printed at different times if available patterned energy, thermal issues, or other matrix configuration issues do not allow for complete utilization.

Figure 5C:
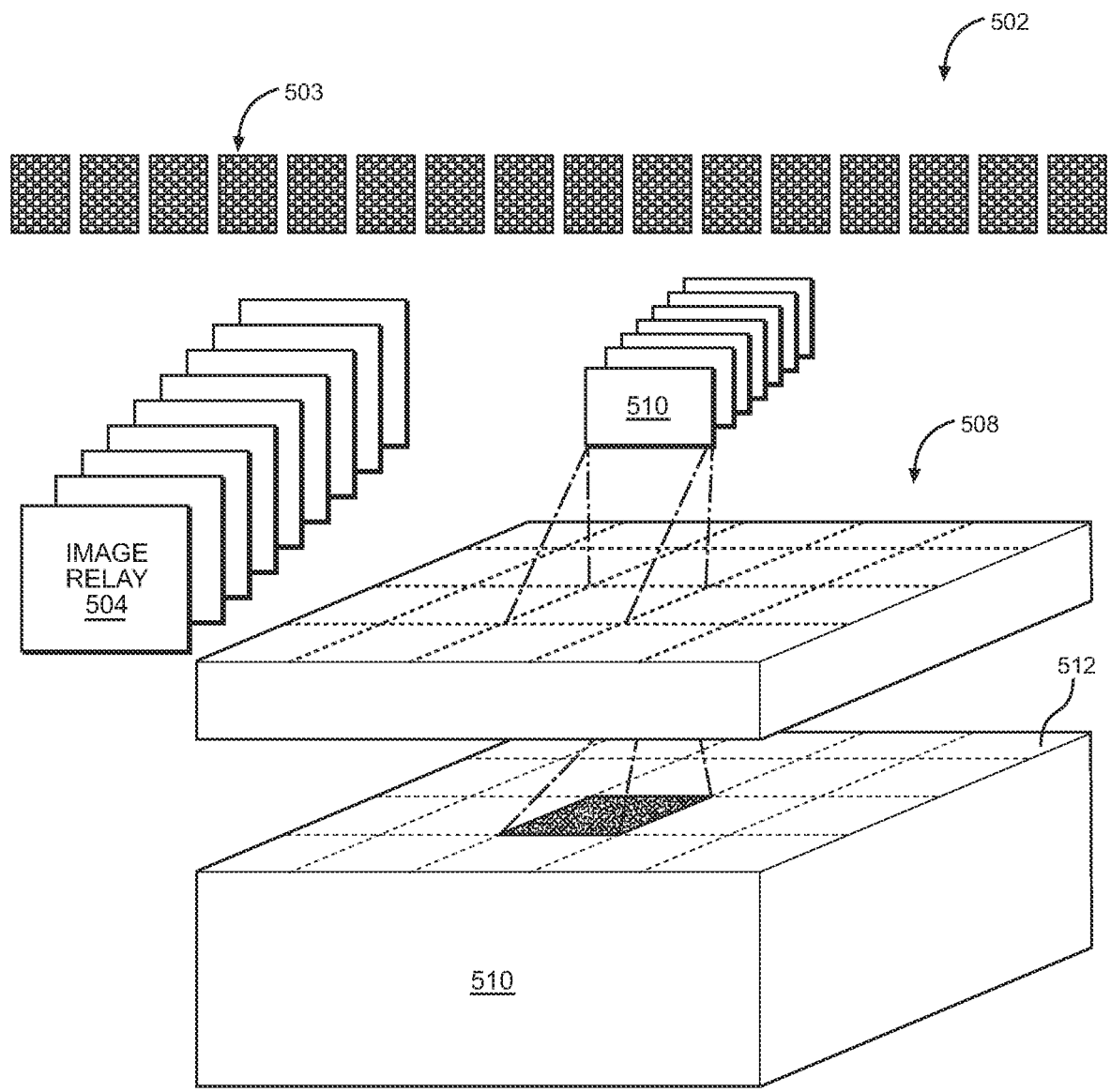
FIG. 5C is a cartoon illustrating area printing of multiple tiles using a solid-state system with a matrix having individual steering units and sized to be coextensive with a powder bed.

FIG. 5C is a cartoon 502 illustrating area printing of multiple tiles using an alternative hierarchical system. Multiple input patterns 503 are redirected by multiple image relays 504 into individual beam steering units 510, which in turn direct patterned images into a matrix 508 incorporating multiple optics and beam steering units. The matrix 508 is sized to be coextensive with the powder, and does not need be moved across powder bed 510. Like the embodiment discusses with respect to FIG. 5A, patterned images can be created using recycled light patterns, including but not limited to an energy patterning binary tree system such as discussed with respect to FIG. 4A. In certain embodiments, multiple tiles can be simultaneously printed in a given time period. Alternatively, a subset of tiles can be printed at different times if available patterned energy, thermal issues, or other matrix configuration issues do not allow for complete utilization.

Figure 6:
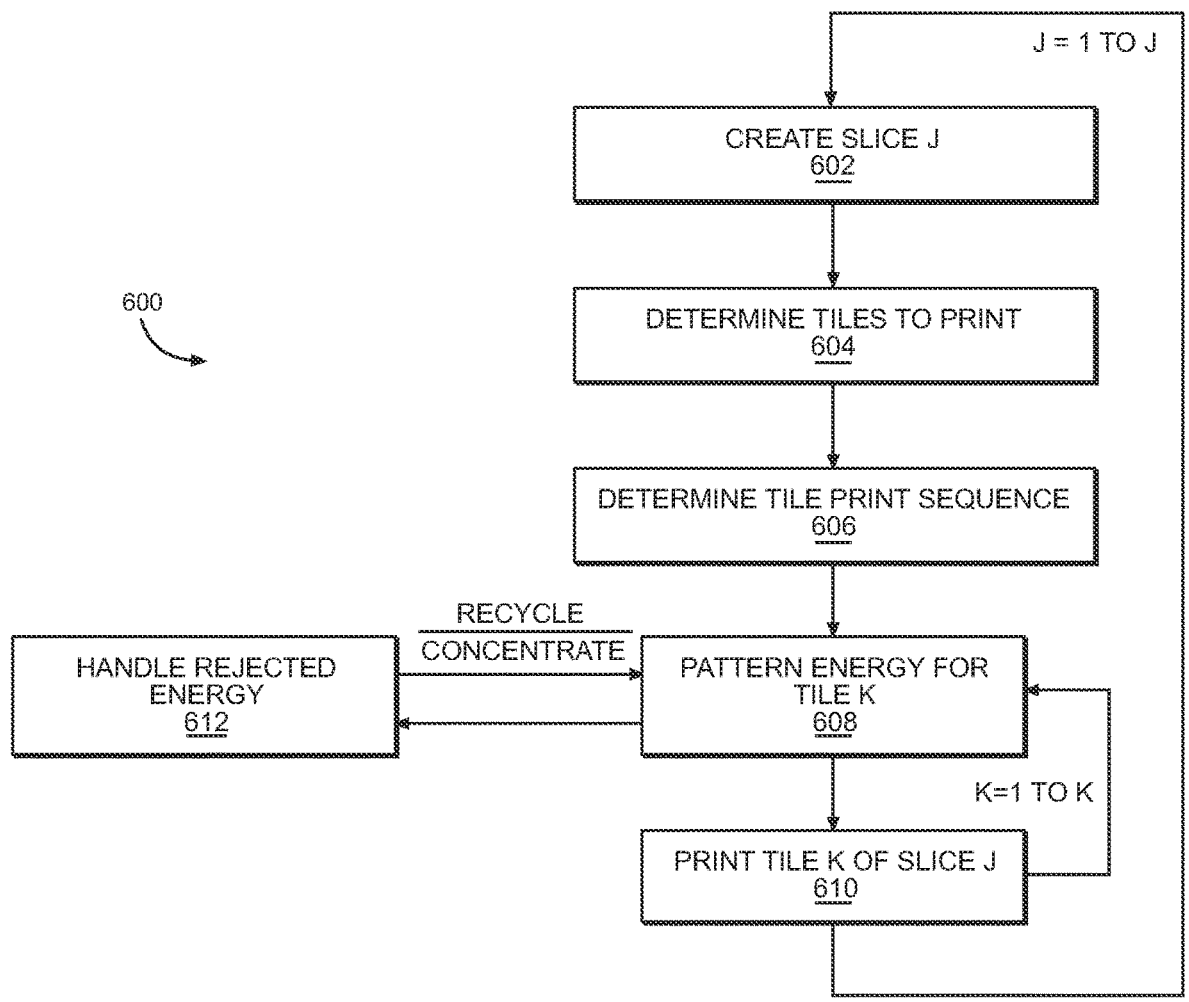
FIG. 6 is a flow chart illustrating aspects of light energy recycling.

FIG. 6 is a flow chart 600 illustrating aspects of light energy recycling. As seen in the Figure, a method for distributing light energy to a predetermined area (e.g. a single print bed) is shown. In step 602 an intended print object (including support structures) is computationally divided or sliced into j slices, j=1 to J. Typically, the entire print object is divided, but in certain embodiments subsets or portions of the entire print object can be manufactured. Each computationally defined slice is fully printed before the next slice.

In step 604, for each slice, all the pixels to be printed are determined and divided into tiles. Tiles can be constructed to have any shape, including square, rectangular, or circular. Tiles do not have to be contiguous with adjacent tiles, and do not have to be identically shaped. Each tile must be addressable as a whole by a two-dimensional energy beam image directed by a transmissive or reflective light valve, or other energy beam patterning unit such as disclosed herein.

In step 606 a sequence is established for printing the K tiles. Typically, contiguous or adjacent tiles can be processed in sequence, but in some embodiments widely separated tiles can be processed. This can allow for better heat distribution and cooling of a part or print bed.

In step 608, the patterned energy to create each desired tile is determined. In step 610, printing of the K tiles in slice j is completed, with the process then being repeated for all J slices.

In steps 612 rejected energy from a light valve can be recycled and/or concentrated to improve print performance or reduce overall energy usage. For example, if a light valve capable of addressing four million (4M) pixels is used, a tile containing one million (1M) pixels can be defined and all the light recycled back to those remaining 1M pixels. This could provide up to a four-fold increase in effective light intensity. The ability to effectively adjust power flux range for each slice/tile and given material and depth of layer to bond affords flexibility in system design and operation. For example, this method is useful in a system where the incoming power flux is P0 but that a higher value P such that $P0<P1<=P<=P2$ is needed for effective melting of a material or defined layer thickness. The method can use recycled or concentrated energy to image the appropriate number of pixels to melt in that time interval by concentrating the power level P within the range [P1, P2].

Figure 7:
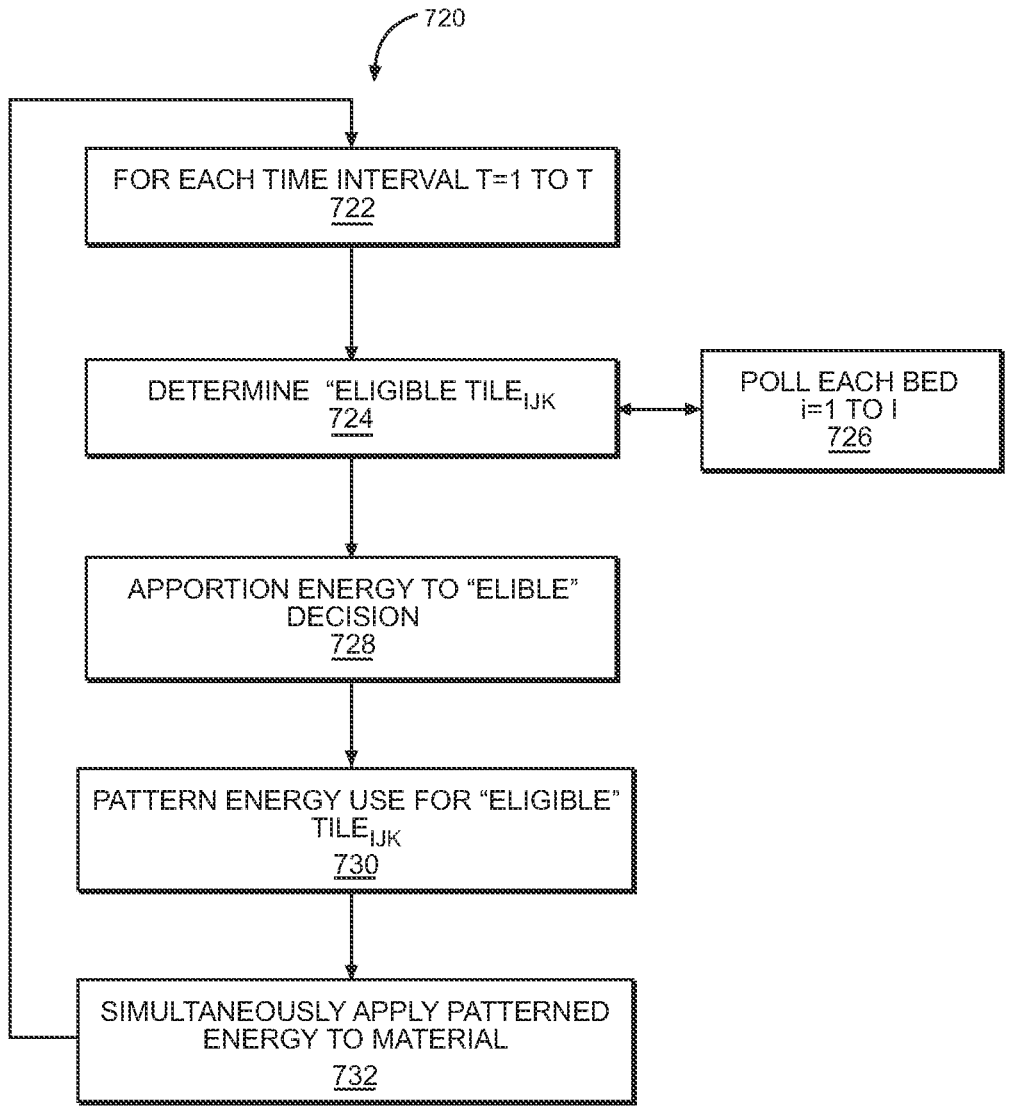
FIG. 7 is a is a flow chart illustrating a temporal algorithm for apportioning light in a solid-state system.

FIG. 7 is a is a flow chart 720 illustrating a method for temporally apportioning available light or energy for a given time period. Typically, light or energy is directed only at one or more print beds ready to receive a patterned image and form a part, but in certain embodiments, some part of the energy can also be homogenized and used for general chamber heating or powder bed conditioning.

In step 722 of the method, until the printing is done, a series of time steps t is defined. In step 724, for each time interval, a list of all (or many) possible print locations and tiles is created. In one embodiment including multiple print beds, one eligible tile for each print bed is selected. In step 728, a decision on how to apportion available light among the eligible tiles is made. The decision can depend upon pixel dimensions, tile priority, pixel remapping capability, or material properties. For example, pixels in low demand can be remapped into high demand pixels or "recycled" to concentrate the power level P). In other embodiments, selected tiles can be preferentially printed before others. This allows adjacency to recently printed tiles or managing a cooling/heating rate for heat treatment. Apportioning energy could also depend on the pixel remapping system, with availability of rotation, inversion, or mirroring capability to modifying tile printing priority. If multiple types of materials are used in the same or different print beds, power levels or energy concentration can be dependent on the melting point of the material. For example, a power level $P_1$ might be required for steel, whereas a higher flux $P_2$ would be required for tungsten.

Figure 8A:
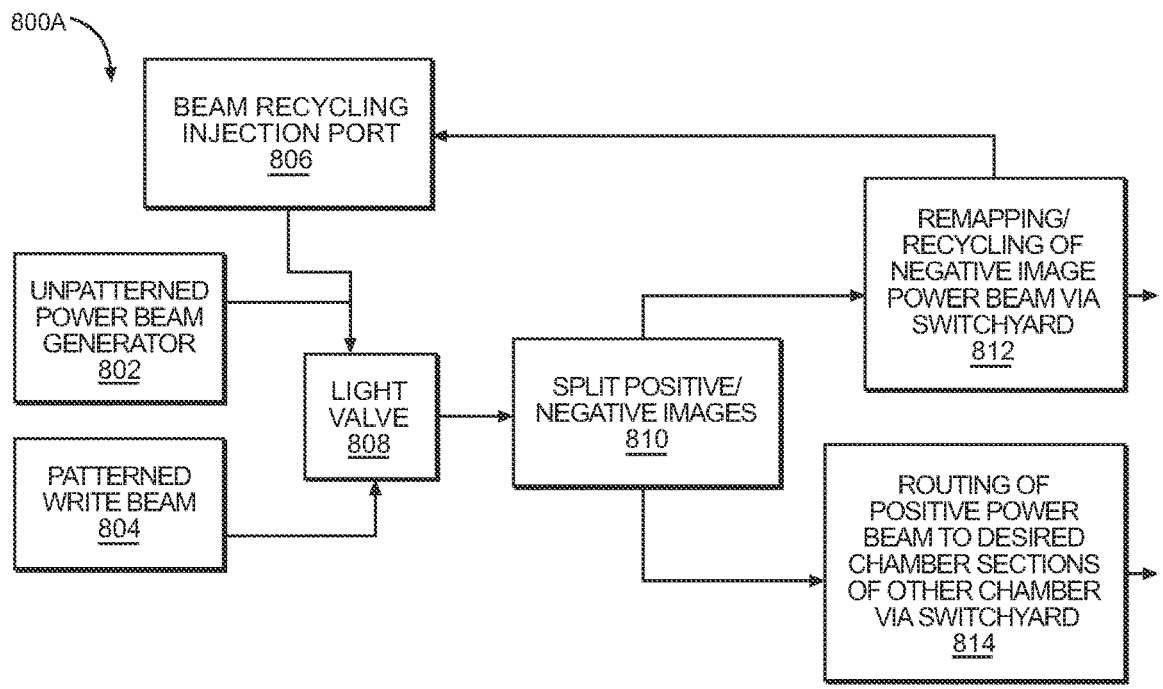
FIGS. 8A and 8B together illustrate an exemplary solid state switchyard system supporting multiple chambers.
Figure 8B:
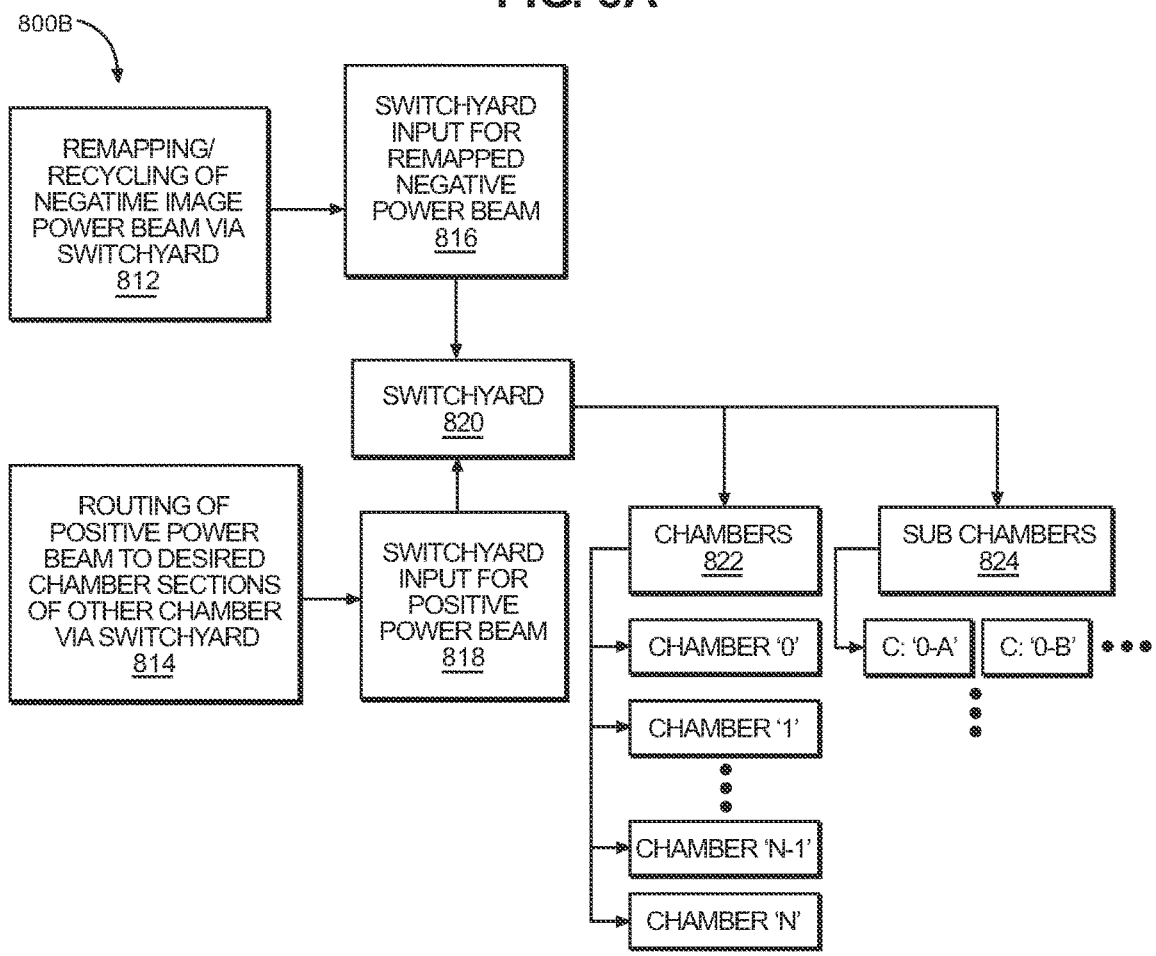

In step 730, the energy is patterned as determined in step 728, and in step 732 all the selected tiles simultaneously receive the patterned energy. In some embodiments, a subset of the energy patterns directed toward a tile can be used to heat, rather than melt or fuse. Finally, the process is repeated for the next time interval defined in step 722. FIGS. 8A and 8B together illustrate an exemplary switchyard system 800A and 800B supporting multiple chambers. Multiple energy beam inputs can include an un-patterned power beam generator 802, a patterned write beam 804, or recycled energy provided via a beam recycling injection port 806. Energy is patterned by a light valve 808, which splits the energy beam into positive and negative images 810. The negative beam 812 can be remapped via a switchyard 820 or recycled through injection port 806. The positive image can be routed to switchyard 820 and directed to desired chamber sections or chambers. Both the switchyard input for a remapped negative power beam 816 and a positive power beam 818 can be routed, combined, redirected, or intensity or pattern modified in switchyard 820. Output from switchyard 820 can be directed to one or more chambers 822, on or more sub-chambers 824, or multiple sub-chambers in multiple chambers.

Advantageously, a switchyard system can support embodiments wherein an image relay preserves both the spatial and angular power density content (in form of etendue) of an image generated and transferred onto an additive manufacturing powder bed. This differs from many conventional image relay systems that preserve spatial properties without preserving angular power density. It also differs from many conventional power transfer optics (i.e. non-imaging optics) that preserve angular power density without preserving spatial properties. Selected embodiments of a switchyard system allow preservation of spatial and angular power density through one or more switching levels to any number of print chambers.

For purposes of this disclosure, etendue can be defined as, from the source point of view, the product of the area of the source and the solid angle that the system's entrance pupil subtends as seen from the source. Equivalently, from the system point of view, the etendue equals the area of the entrance pupil times the solid angle the source subtends as seen from the pupil.

Etendue is important because it never decreases in any optical system where optical power is conserved. A perfect optical system produces an image with the same etendue as the source. The etendue is related to the Lagrange invariant and the optical invariant, which share the property of being constant in an ideal optical system. The radiance of an optical system is equal to the derivative of the radiant flux with respect to the etendue. Etendue can also be considered in terms of a beam parameter product (BPP) in units of mm*mrad. This corresponds to the length of a square emission area multiplied by an emission angle of the source as compared to the length of a square receiving area multiplied by a receiving angle of the image plane. In one embodiment, the two-dimensional patterned energy beam preserves greater than 50% of angular power density and 75% of etendue content of a two-dimensional patterned image generated at the beam patterning unit and received at the least one powder bed. In other preferred embodiments, the two-dimensional patterned energy beam preserves greater than 70% of angular power density and 85% of etendue content of a two-dimensional patterned image generated at the beam patterning unit and received at the least one powder bed. In certain embodiments, the power is provided by one or more diode lasers.

As will be appreciated, there are many applications suitable for use with the foregoing described embodiments. For example, medical applications could include fast tattoo or port wine stain removal by patterning shape and intensity of medical laser to more quickly saturate tattoo ink providing less damage and pain to customer. Skin resurfacing or modification by patterning shape and intensity based on desired treatment is possible, as is surgical cauterization on varying tissue by patterning shape and intensity level. Another potential application is cancer removal using patterned light and intensity with either photo-dynamic therapy or via fluorophore patterning. Similarly, bone, tooth, eye lens, or eye cataract removal can be improved by the availability of lower thermal impact patterning and reshaping.

Material processing can also be improved by the described light processing methods and systems, with processing of 3D printed part, deburring, smoothing or texture surfacing of additively manufactured or machined parts being simplified. Volumetric modifications of stress (either removal or enhancement) of 'transparent' structures are possible. Image based welding on critical alignment assemblies; image based product authentication by embedding stress patterns that can only be viewed using stress metrology; and image based drilling are also improved.

Military applications can include stress pattern authentication, phase and amplitude patterning of energy weapons aberrations corrections, and target surface penetration enhancement. The describe time based beam steering is directly applicable for time sharing of centralized energy weapon system to multiple emission ports. Other military application could include image shaped plasma creation and lensing, and simultaneous targeting of multiple objects without requiring use of fragile and difficult to position optomechanical systems.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A switchyard beam routing system for additive manufacturing, comprising:
   an energy beam;
   a beam patterning unit to generate a two-dimensional patterned energy beam from the energy beam;
   a plurality of energy switching units to direct the two-dimensional patterned energy beam into a plurality of directed two-dimensional patterned energy beams;
   a plurality of energy steering units to receive and steer the plurality of directed two-dimensional patterned energy beams, and
   at least one powder bed to receive at least a portion of the directed two-dimensional patterned energy beams that are steered by the plurality of energy steering units,
   wherein at least one of the plurality of energy switching units is configured to selectively direct the two-dimensional patterned energy beam to at least two energy switching units by selectively polarizing the two-dimensional patterned energy beam into one of two polarization states, forming a switching hierarchy.

2. The switchyard beam routing system of claim 1, wherein the two-dimensional patterned energy beam preserves greater than 50% of angular power density and 75% of spatial etendue content of a two-dimensional patterned image generated at the beam patterning unit and received at the least one powder bed.

3. The switchyard beam routing system of claim 1, wherein at least some of the plurality of energy switching units are arranged in the switching hierarchy, and wherein at least two of the plurality of energy switching units are configured to direct a two-dimensional patterned energy beams therebetween.

4. The switchyard beam routing system of claim 1, wherein the energy beam comprises a laser beam, wherein the beam patterning unit contains at least one light valve configured to apply a first positive pattern passed by the light valve and a second negative pattern consisting of laser light rejected by the light valve, wherein the energy switching units direct two-dimensional patterned laser beams, and wherein the plurality of energy steering units receive the two-dimensional patterned laser beams.

5. A switchyard beam routing system for additive manufacturing, comprising:
an energy beam;
a beam patterning unit to generate a two-dimensional patterned energy beam from the energy beam;
a plurality of energy switching units to direct the two-dimensional patterned energy beam into a plurality of directed two-dimensional patterned energy beams;
a plurality of energy steering units to receive and steer the plurality of directed two-dimensional patterned energy beams, and
at least one powder bed to receive at least a portion of the directed two-dimensional patterned energy beams that are steered by the plurality of energy steering units,
wherein at least some of the plurality of energy switching units are arranged in a switching hierarchy, and
wherein at least two of the plurality of energy switching units are configured to selectively direct a two-dimensional patterned energy beams therebetween by selectively polarizing the two-dimensional patterned energy beam into one of two polarization states.

6. The switchyard beam routing system of claim 5, wherein the two-dimensional patterned energy beam preserves greater than 50% of angular power density and 75% of spatial etendue content of a two-dimensional patterned image generated at the beam patterning unit and received at the least one powder bed.

7. The switchyard beam routing system of claim 5, wherein at least one of the plurality of energy switching units is configured to direct the two-dimensional patterned energy beam to at least two energy switching units, forming the switching hierarchy.

8. The switchyard beam routing system of claim 5, wherein the energy beam comprises a laser beam, wherein the beam patterning unit contains at least one light valve configured to apply a first positive pattern passed by the light valve and a second negative pattern consisting of laser light rejected by the light valve, wherein the energy switching units direct two-dimensional patterned laser beams, and wherein the plurality of energy steering units receive the two-dimensional patterned laser beams.

9. A switchyard beam routing system, comprising:
an energy beam;
a beam patterning unit to generate a two-dimensional patterned energy beam from the energy beam;
a plurality of energy switching units to direct the two-dimensional patterned energy beam into a plurality of directed two-dimensional patterned energy beams, wherein at least one of the plurality of energy switching units is configured to selectively direct a two-dimensional patterned energy beam to at least two energy switching units by selectively polarizing the two-dimensional patterned energy beam into one of two polarization states, forming a switching hierarchy.

10. The switchyard beam routing system of claim 9, wherein at least two of the plurality of energy switching units are configured to direct a two-dimensional patterned energy beams therebetween.

11. The switchyard beam routing system of claim 9, further comprising a plurality of energy steering units to receive and direct the two-dimensional patterned energy beams, and
at least one powder bed to receive at least a portion of the directed two-dimensional patterned energy beam from at least one of the plurality of energy steering units.

12. The switchyard beam routing system of claim 9, further comprising a plurality of energy steering units to receive and direct the two-dimensional patterned energy beams, and wherein at least one of the energy steering units further comprises movable mirrors.

13. The switchyard beam routing system of claim 9, wherein the energy beam comprises a laser beam, wherein the beam patterning unit contains at least one light valve configured to apply a first positive pattern passed by the light valve and a second negative pattern consisting of laser light rejected by the light valve, and wherein the energy switching units direct two-dimensional patterned laser beams.

* * * * *